``

US009944858B2

(12) United States Patent
Maschmeyer et al.

(10) Patent No.: US 9,944,858 B2
(45) Date of Patent: Apr. 17, 2018

(54) METHODS FOR BIOFUEL PRODUCTION

(75) Inventors: Thomas Maschmeyer, Lindfield (AU); Leonard James Humphreys, Roseville Chase (AU)

(73) Assignees: Licella Pty Limited, New South Wales (AU); Ignite Resources Pty Ltd., New South Wales (AU); Licella Fibre Fuels Pty Ltd., New South Wales (AU)

( * ) Notice: Subject to any disclaimer, the term of this patent is extended or adjusted under 35 U.S.C. 154(b) by 987 days.

(21) Appl. No.: 13/639,739

(22) PCT Filed: Apr. 7, 2011

(86) PCT No.: PCT/AU2011/000404
§ 371 (c)(1),
(2), (4) Date: Mar. 18, 2013

(87) PCT Pub. No.: WO2011/123897
PCT Pub. Date: Oct. 13, 2011

(65) Prior Publication Data
US 2013/0192123 A1 Aug. 1, 2013

(30) Foreign Application Priority Data
Apr. 7, 2010 (AU) ................................ 2010901473

(51) Int. Cl.
*C10G 1/06* (2006.01)
*C10G 1/08* (2006.01)
*C10G 3/00* (2006.01)
*C10L 1/02* (2006.01)
*C10L 1/04* (2006.01)

(52) U.S. Cl.
CPC ............... *C10G 1/06* (2013.01); *C10G 1/083* (2013.01); *C10G 1/086* (2013.01); *C10G 3/44* (2013.01); *C10G 3/50* (2013.01); *C10L 1/02* (2013.01); *C10L 1/04* (2013.01); *C10G 2300/1014* (2013.01); *C10G 2300/4006* (2013.01); *C10G 2300/4012* (2013.01); *C10G 2300/44* (2013.01); *C10G 2300/805* (2013.01); *Y02P 30/20* (2015.11)

(58) Field of Classification Search
USPC .................................. 44/307, 605
See application file for complete search history.

(56) References Cited

U.S. PATENT DOCUMENTS

| | | | |
|---|---|---|---|
| 3,864,096 A | 2/1975 | Urban | |
| 4,266,083 A | 5/1981 | Huang | |
| 4,396,786 A | 8/1983 | Bond et al. | |
| 4,451,351 A | 5/1984 | Porter et al. | |
| 4,670,613 A | 6/1987 | Ruyter et al. | |
| 4,846,963 A | 7/1989 | Knudson et al. | |
| 4,935,567 A | 6/1990 | Yokoyama et al. | |
| 5,997,751 A * | 12/1999 | Higo .......................... | B01J 3/00 210/758 |
| 2008/0050792 A1 | 2/2008 | Wlodzimierz et al. | |
| 2008/0216391 A1 | 9/2008 | Cortirght et al. | |
| 2009/0004529 A1* | 1/2009 | Gur ................... | H01M 8/04007 429/425 |
| 2009/0152171 A1 | 6/2009 | Zhang et al. | |
| 2010/0069626 A1* | 3/2010 | Kilambi ................... | C08H 8/00 536/56 |
| 2010/0192457 A1 | 8/2010 | Tsurutani et al. | |
| 2011/0154722 A1* | 6/2011 | Chheda ................... | C10G 3/45 44/307 |
| 2011/0209387 A1* | 9/2011 | Humphreys ............... | C10L 1/02 44/307 |

FOREIGN PATENT DOCUMENTS

| | | |
|---|---|---|
| EP | 1862527 A1 | 12/2007 |
| WO | 02/020699 A1 | 3/2002 |
| WO | 06/117002 A2 | 11/2006 |
| WO | 09/009976 A1 | 1/2009 |
| WO | 09/014225 A1 | 1/2009 |
| WO | 2010/030196 A1 | 3/2010 |
| WO | 10/034055 A1 | 4/2010 |
| WO | 10/037178 A1 | 4/2010 |

OTHER PUBLICATIONS

Zhu et al., "Preparing strong basic zeolite molecular sieve catalytic materials," 1999, Chinese Science Bulletin, S CN, vol. 44, No. 21 (Nov. 1, 1999), pp. 1926-1934.

* cited by examiner

*Primary Examiner* — Ellen McAvoy
*Assistant Examiner* — Chantel Graham
(74) *Attorney, Agent, or Firm* — McDonnell Boehnen Hulbert & Berghoff LLP

(57) ABSTRACT

The invention relates generally to methods for the production of biofuels from organic matter, the methods comprising treating the organic matter with an aqueous solvent and at least one additional catalyst under conditions of heat and pressure. The invention also relates to biofuel products obtainable by the methods.

21 Claims, 30 Drawing Sheets

Table 1: summary catalysts and corresponding reactions

| Reaction Type | Catalyst Family | Catalyst Family Member | Specific Examples | Preferred catalyst segments |
|---|---|---|---|---|
| Hydrolysis | Base catalysts | Sub/super-critical water | Hydroxide ion in sub/super-critical water | |
| | | All alkali and transition metal salts, both cations and anions can contribute. Include all common inorganic anions | M = any alkali or transition metal<br><br>A = anions, including: aluminate, sulfate, sulfite, sulfide phosphate, phosphite nitrate, nitrite silicate hydroxide alkoxide carbonate oxide | M = Na, K, Fe, Ca, Ba<br><br>A = aluminate, phosphate, silicate, hydroxide, methoxide, ethoxide carbonate sulphate sulphide disulphide ($FeS_2$) oxide |
| | | Any organic base | ammonia, pyridine, etc. | |
| Hydrolysis | Acid catalysts (slower) | Sub/super-critical water | Hydronium ion in sub/super-critical water | |
| | | Any liquid mineral or organic acid | HA, where<br><br>A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals |

Figure 8.

| Dehydration (elimination) | Acid catalysts | Sub/super-critical water | Hydronium ion in sub/super-critical water | |
|---|---|---|---|---|
| | | Any liquid mineral or organic acid | HA, where A = anions, including: aluminate, sulfate, sulfite, sulfide phosphate, phosphite nitrate, nitrite silicate hydroxide alkoxide carbonate carboxy group | Acids may form from the in-situ formation of carboxylic acids, phenolics and the presence of minerals. zeolites or alumino-silicates in general may be added |
| Transfer Hydrogenation or in-situ $H_2$ generation | Transfer hydrogenation catalysts | All alkali and transition metal hydroxides and formates | M = any alkali or transition metal | M = Na, K |
| | | All reactive carboxylic acids | A = hydroxide, formate | A = hydroxide, formate formic, acetic |
| | | All transition and noble metals | All transition and noble metals | M = Pd, Pd, Ni Ru Rh |
| Decarboxylation | Largely thermal | Acid and transition (noble) metal cats have been reported to aid the process | All transition and noble metals supported on solid acids | $Pt/Al_2O_3/SiO_2$ $Pd/Al_2O_3/SiO_2$ $Ni/Al_2O_3/SiO_2$ |
| Decarbonylation | Largely thermal | As for decarboxylation | As for decarboxylation | As for decarboxylation |
| In-situ gasification | Largely thermal | Transition metals | supported transition metals | $Pt/Al_2O_3/SiO_2$ $Pd/Al_2O_3/SiO_2$ $Ni/Al_2O_3/SiO_2$ |
| | | | sulfides | $Fe_xS_y$ $FeS/Al_2O_3$ $FeS/SiO_2$ $FeS/Al_2O_3/SiO_2$ |

Figure 8 (continued).

| Water-Gas Shift | WGS catalysts | Standard WGS catalysts | As per literature | As per literature |
|---|---|---|---|---|
| Direct Hydrogenation with $H_2$ | Transition metals | Zero valent metals | | Pt, P, Ni as zero valent |
| | | Sulfides | | FeS, $Fe_xS_y$ |
| Hydrode-oxygenation | Combined acid and hydrogenation catalyst | Transition metal and solid acid | M = transition metal<br><br>A = acidic solid | $Pt/Al_2O_3/SiO_2$<br>$Pd/Al_2O_3/SiO_2$<br>$Ni/Al_2O_3/SiO_2$<br>$NiO/MoO_3$<br>$CoO/MoO_3$<br>$NiO/WO_2$<br><br>zeolites loaded with noble metals, e.g. ZSM-5, Beta, ITQ-2 |

Figure 8 (continued).

Table 4a: analysis of lignite-derived coal oil product

| Lignite feedstock no. | Product analysed | Fraction of coal feed by mass as oil distillate | GCV (MJ/kg as) | Carbon (%wt db) | Hydrogen (%wt db) | Nitrogen (%wt db) | Sulphur (%wt db) | Ash (%wt db) | Oxygen (%wt db) |
|---|---|---|---|---|---|---|---|---|---|
| | | | | | | Oil Distillate | | | |
| 1 | Coal Oil | note: wet analysis | | 56.43 | 9.59 | 0.65 | 0.20 | 0.08 | |
| 2 | Coal Oil | | 37.2 | 78.64 | 8.16 | | 0.3 | 1.00 | 12.2 |
| | Middle Distillate | distillate | 39.1 | | | | | | |
| 3 | Coal Oil | | 39.3 | 82.7 | 8.4 | 0.4 | 0.2 | 0.3 | 7.9 |
| 4 | Coal Oil | 43% | 38.4 | 84.3 | 9.1 | 0.4 | 0.2 | 0.1 | 6.0 |
| 5 | Coal Oil | 23% | 39.3 | 83.2 | 9.1 | 0.2 | 0.1 | 0.1 | 7.4 |
| | | 23% | | 82.8 | 9.6 | | | | 7.6 |
| 6 | Coal Oil | 26% | 37.0 | 86.4 | 8.8 | 0.3 | 0.1 | 0.1 | 10.2 |
| | | 28% | | 83.9 | 9.4 | | | | 6.7 |
| 7 | Coal Oil | 32% | 38.7 | 82.5 | 9.0 | 0.3 | 0.1 | 0.1 | 8.0 |
| | | 32% | | 82.8 | 9.2 | | | | 8.0 |
| 8 | Coal Oil | 23% | 38.7 | 83.5 | 9.7 | 0.3 | 0.2 | | 6.4 |
| 9 | Coal Oil | 23% | 32.5 | 79.8 | 8.1 | 0.4 | 0.2 | | 8.5 |
| 10 | Coal Oil | 16% | 38.5 | 82.2 | 8.8 | 0.3 | 0.2 | | 8.6 |
| 11 | Coal Oil | 19% | 39.2 | 79.9 | 8.8 | 0.2 | 0.2 | | 7.1 |

Figure 9.

Table 4a (continued): analysis of lignite-derived coal oil product

| Sample No. | Sample | Indication of oil yield | GCV (MJ/kg db) | Carbon (%wt db) | Hydrogen (%wt db) | Nitrogen (%wt db) | Sulphur (%wt db) | Ash (%wt db) | Oxygen (%wt db) | Molar H/C Ratio |
|---|---|---|---|---|---|---|---|---|---|---|
| 12 | Coal Oil | 14-30 % | | | | | | | | - |
| 13 | Coal Oil | 14-30 % | 39.23 | 83.06 | 9.20 | 0.21 | 0.16 | - | 7.37 | 1.32 |
| 14 | Coal Oil | 14-30 % | 38.63 | 82.67 | 9.20 | 0.23 | 0.16 | - | 7.75 | 1.33 |
| 15 | Coal Oil | 14-30 % | 39.32 | 82.75 | 9.10 | 0.27 | 0.17 | - | 7.71 | 1.31 |
| 16 | Coal Oil | 14-30 % | 36.63 | 81.77 | 9.00 | 0.19 | 0.18 | 0.01 | 8.86 | 1.31 |
| 17 | Coal Oil | 14-30 % | 38.33 | 83.47 | 8.90 | 0.28 | 0.17 | 0.02 | 7.16 | 1.27 |
| 18 | Coal Oil | 14-30 % | 39.42 | 82.95 | 9.29 | 0.26 | 0.33 | 0.10 | 7.06 | 1.34 |
| 19 | Coal Oil | 14-30 % | 39.64 | 84.73 | 9.08 | 0.30 | 0.33 | 0.10 | 5.45 | 1.28 |
| 20 | Coal Oil | 14-30 % | 39.34 | 83.28 | 9.20 | 0.24 | 0.38 | 0.10 | 6.80 | 1.32 |
| 21 | Coal Oil | 14-30 % | 39.36 | 84.14 | 9.29 | 0.29 | 0.35 | 0.10 | 5.83 | 1.32 |
| 22 | Coal Oil | 14-30 % | 39.33 | 82.77 | 9.00 | 0.37 | 0.39 | 0.10 | 7.37 | 1.30 |
| 23 | Coal Oil | 14-30 % | | | | | | | | |

Figure 9 (continued).

Table 4b: analysis of lignite-derived upgraded pulverised coal injection (PCI) equivalent (char) product

| Lignite feedstock no. | Product analysed | Proximate Analysis | | | | Ultimate and CV Analysis | | | | | |
|---|---|---|---|---|---|---|---|---|---|---|---|
| | | Moisture (%wt ar) | Ash (%wt db) | Volatiles (%wt db) | Fixed C (%wt db) | GCV (MJ/kg db) | Carbon (%wt db) | Hydrogen (%wt db) | Nitrogen (%wt db) | Sulphur (%wt db) | Oxygen (%wt db) | Molar H/C Ratio |
| 2 | PCI | 4.60 | 2.70 | 26.2 | 71.1 | 30.62 | 76.9 | 3.57 | 0.89 | 0.31 | 13.6 | 0.54 |
| 3 | PCI | 2.20 | 3.30 | 27.6 | 66.9 | 31.12 | 78.1 | 4.18 | 0.90 | 0.18 | 13.3 | 0.64 |
| 4 | PCI | 1.60 | 2.60 | 20.5 | 76.9 | 33.30 | 84.5 | 3.80 | 0.69 | 0.10 | 8.1 | 0.54 |
| 5 | PCI | 2.60 | 3.70 | 29.3 | 67.1 | 30.20 | 77.8 | 3.70 | 0.75 | 0.18 | 13.9 | 0.57 |
| 6 | PCI | 1.80 | 6.30 | 22.1 | 71.6 | 31.80 | 80.1 | 3.80 | 0.75 | 0.23 | 8.8 | 0.57 |
| 7 | PCI | 1.40 | 5.03 | 25.1 | 69.9 | 32.30 | 81.0 | 4.10 | 0.74 | 0.18 | 9.0 | 0.60 |
| 8 | PCI | 0.80 | 3.80 | 26.6 | 69.5 | 31.40 | 79.9 | 4.10 | 0.75 | 0.20 | 11.3 | 0.61 |
| 9 | PCI | 1.00 | 4.20 | 26.9 | 68.9 | 31.6 | 79.1 | 4.80 | 0.66 | 0.22 | 16.7 | 0.73 |
| 10 | PCI | 3.80 | 5.20 | 32.8 | 62.0 | 28.90 | 73.4 | 4.10 | 0.83 | 0.28 | 16.2 | 0.67 |
| 11 | PCI | 6.00 | 14.3 | 30.1 | 55.6 | 27.52 | 69.9 | 3.47 | 0.79 | 2.59 | 8.9 | 0.59 |

Table 4b (continued): analysis of lignite-derived upgraded pulverised coal injection (PCI) equivalent (char) product

| Lignite feedstock no. | Product analysed | Ash Constituents | | | | | | | | | | | |
|---|---|---|---|---|---|---|---|---|---|---|---|---|---|
| | | SiO2 | Al2O3 | Fe2O3 | CaO | MgO | Na2O | K2O | TiO2 | Mn3O4 | P2O5 | SO3 | BaO |
| 2 | PCI | 17.70 | 7.70 | 12.80 | 2.80 | 15.60 | 0.80 | 22.60 | 20.50 | 1.00 | 0.12 | 0.23 | 0.14 |
| 3 | PCI | 16.00 | 5.80 | 13.60 | 20.00 | 0.44 | 0.55 | 25.60 | 17.30 | 0.40 | 0.19 | 0.56 | 0.17 |
| 4 | PCI | 11.10 | 4.80 | 18.50 | 0.39 | 18.40 | 13.00 | 16.90 | 18.40 | | | | |
| 5 | PCI | 6.60 | 4.30 | 52.80 | 0.30 | 13.80 | 1.70 | 5.40 | 10.90 | | | | |
| 6 | PCI | 4.90 | 3.10 | 34.20 | 0.21 | 11.60 | 28.10 | 3.50 | 10.20 | | | | |
| 7 | PCI | | | | | | | | | | | | |
| 8 | PCI | 6.80 | 2.50 | 42.10 | 0.25 | 15.40 | 12.10 | 6.50 | 13.70 | 0.48 | | | |
| 9 | PCI | 6.40 | 3.60 | 45.40 | 0.32 | 15.60 | 6.80 | 7.20 | 12.90 | 0.30 | | | |
| 10 | PCI | 13.40 | 7.20 | 31.90 | 0.53 | 10.80 | 12.50 | 11.70 | 0.68 | 0.11 | | | 0.05 |
| 11 | PCI | 9.50 | 15.20 | 18.50 | 0.25 | 7.20 | 0.39 | 23.30 | 23.30 | | 0.09 | 0.11 | 0.02 |

Figure 10.

Table 4b (continued): analysis of lignite-derived upgraded pulvarised coal injection (PCI) equivalent (char) product

| Lignite feedstock no. | Product analysed | Ash fusion temperature | | | |
|---|---|---|---|---|---|
| | | AFT-Ox DT (C) | AFT-Ox ST (C) | AFT-Ox HT (C) | AFT-Ox FT (C) |
| 2 | PCI | | | | |
| 3 | PCI | | | | |
| 4 | PCI | | | | |
| 5 | PCI | | | | |
| 6 | PCI | | | | |
| 7 | PCI | | | | |
| 8 | PCI | | | | |
| 9 | PCI | | | | |
| 10 | PCI | >1550 | >1550 | >1550 | >1550 |
| 11 | PCI | | | | |

Figure 10 (continued).

Table 4b (Continued): Analysis of Lignite-derived Upgraded Pulverized Coal Injection (PCI) Equivalent (Char) Product

| Sample No. | Product Analysed | Proximate Analysis | | | | Ultimate and CV Analysis | | | | | | Molar H/C Ratio |
|---|---|---|---|---|---|---|---|---|---|---|---|---|
| | | Moisture (%wt ar) | Ash (%wt db) | Volatiles (%wt db) | Fixed C. (%wt db) | GCV (MJ/kg db) | Carbon (%wt db) | Hydrogen (%wt db) | Nitrogen (%wt db) | Sulphur (%wt db) | Oxygen (%wt db) | |
| 12 | PCI | 2.00 | 4.90 | 28.1 | 67.0 | 29.9 | 76.3 | 3.90 | 0.80 | 0.28 | 13.8 | 0.61 |
| 13 | PCI | 1.40 | 5.10 | 27.1 | 67.9 | 30.1 | 76.4 | 4.10 | 0.87 | 0.27 | 13.3 | 0.64 |
| 14 | PCI | 0.70 | 6.80 | 27.4 | 65.9 | 29.8 | 75.8 | 4.20 | 0.87 | 0.27 | 12.1 | 0.66 |
| 15 | PCI | 7.00 | 5.50 | 40.3 | 54.2 | 30.2 | 74.6 | 5.00 | 0.74 | 0.36 | 13.9 | 0.80 |
| 16 | PCI | 1.20 | 7.20 | 26.9 | 65.8 | 29.6 | 74.5 | 3.90 | 0.85 | 0.26 | 13.3 | 0.62 |
| 17 | PCI | 0.40 | 7.80 | 26.8 | 65.4 | 30.2 | 76.5 | 4.10 | 0.95 | 0.49 | 10.2 | 0.64 |
| 18 | PCI | 0.60 | 7.30 | 24.6 | 37.8 | 30.8 | 77.8 | 4.00 | 0.90 | 0.50 | 9.5 | 0.61 |
| 19 | PCI | 0.90 | 7.30 | 29.0 | 63.7 | 30.2 | 76.2 | 4.20 | 0.89 | 0.34 | 11.1 | 0.66 |
| 20 | PCI | 0.90 | 6.50 | 30.5 | 63.0 | 29.7 | 75.9 | 4.40 | 1.03 | | 12.2 | 0.69 |
| 21 | PCI | 1.20 | 7.20 | 29.7 | 63.1 | 30.0 | 75.8 | 4.30 | 1.03 | 0.46 | 11.2 | 0.68 |
| 22 | PCI | 36.40 | 6.90 | 43.6 | 49.6 | 28.0 | 69.9 | 5.10 | 0.91 | 0.69 | 16.5 | 0.87 |
| 23 | PCI | | | | | | | | | | | - |

Figure 10 (continued).

Table 4b (Continued): Analysis of Lignite-derived Upgraded Pulverized Coal Injection (PCI) Equivalent (Char) Product

| Sample No. | SiO2 (%wt db) | Al2O3 (%wt db) | Fe2O3 (%wt db) | TiO2 (%wt db) | K2O (%wt db) | MgO (%wt db) | Na2O (%wt db) | CaO (%wt db) | SO3 (%wt db) | P2O5 (%wt db) | Mn3O4 (%wt db) | SrO (%wt db) | BaO (%wt db) | ZnO (%wt db) | V2O5 (%wt db) |
|---|---|---|---|---|---|---|---|---|---|---|---|---|---|---|---|
| 12 | 18.70 | 9.40 | 37.90 | 0.68 | 0.58 | 12.10 | 2.20 | 8.90 | 8.20 | 0.23 | | | | | |
| 13 | 18.50 | 9.40 | 38.70 | 0.78 | 0.57 | 10.90 | 1.70 | 7.80 | 8.40 | 0.24 | | | | | |
| 14 | 11.9 | 6.6 | 47.2 | 0.50 | 0.66 | 10 | 4.4 | 7.7 | 9.5 | 0.16 | | | | | |
| 15 | 19.00 | 8.30 | 45.50 | 0.79 | 0.49 | 8.60 | 2.30 | 6.80 | 6.30 | 0.17 | | | | | |
| 16 | 26.10 | 8.60 | 46.90 | 0.63 | 0.90 | 6.60 | 1.80 | 5.60 | 3.90 | 0.77 | | | | | |
| 17 | 23.00 | 7.30 | 29.90 | 0.44 | 0.38 | 7.10 | 0.60 | 18.50 | 14.20 | 0.05 | | | | | |
| 18 | 24.80 | 8.20 | 29.00 | 0.56 | 0.41 | 9.10 | 1.60 | 16.30 | 12.40 | 0.10 | | | | | |
| 19 | 28.80 | 9.00 | 28.00 | 0.66 | 0.40 | 9.80 | 1.60 | 14.80 | 8.00 | 0.11 | | | | | |
| 20 | 17.00 | 6.90 | 24.50 | 0.43 | 0.30 | 8.20 | 0.50 | 25.90 | 18.00 | 0.10 | | | | | |
| 21 | 23.00 | 7.30 | 24.00 | 0.46 | 0.24 | 8.00 | 1.20 | 24.40 | 13.30 | 0.05 | | | | | |
| 22 | | | | | | | | | | | | | | | |
| 23 | | | | | | | | | | | | | | | |

Figure 10 (continued).

Table 4b (Continued): Analysis of Lignite-derived Upgraded Pulverized Coal Injection (PCI) Equivalent (Char) Product

| Sample No. | Ash fusion temperature | | | |
|---|---|---|---|---|
| | AFT-Ox DT (C) | AFT-Ox ST (C) | AFT-Ox HT (C) | AFT-Ox FT (C) |
| 12 | | | | |
| 13 | | | | |
| 14 | | | | |
| 15 | 1,410 | 1,430 | 1,460 | 1,480 |
| 16 | | | | |
| 17 | | | | |
| 18 | 1,180 | 1,190 | 1,190 | 1,200 |
| 19 | 1,030 | 1,050 | 1,060 | 1,170 |
| 20 | 1,290 | 1,300 | 1,310 | 1,320 |
| 21 | 1,160 | 1,200 | 1,210 | 1,210 |
| 22 | | | | |
| 23 | | | | |

Figure 10 (continued).

Table 5: Analysis of Lignocellulosic Matter-derived Bio-oil Product

| Lignocellulosic feedstock no. | Product analysed | [fraction of distillate boiling below 360°C] | GCV (MJ/kg ar) | Carbon (%wt db) | Hydrogen (%wt db) | Oil Distillate: Nitrogen (%wt db) | Sulphur (%wt db) | Ash (%wt db) | Oxygen (%wt db) | Molar H/C Ratio |
|---|---|---|---|---|---|---|---|---|---|---|
| 1 | Bio-oil | <98% | | 78.71 | 6.59 | | | | 18.04 | 1.0 |
| 2 | Bio-oil | >98% | 37.5 | 82.2 | 8.6 | 0.4 | 0.1 | 0.4 | 8.3 | 1.3 |
| 3 | Bio-oil | >98% | 36.6 | 82.6 | 8.7 | 0.9 | 0.6 | - | 9.1 | 1.0 |
| 4 | Bio-oil | >98% | 34.9 | 81.0 | 9.5 | 0.5 | 0.1 | - | 8.7 | 1.4 |

Figure 11.

Table 5 (Continued): analysis of lignocellulosic matter-derived bio-oil product

| Sample No. | Product Analysed | Indication of oil yield | GCV (MJ/Kg) | Carbon (%wt db) | Hydrogen (%wt db) | Nitrogen (%wt db) | Sulphur (%wt db) | Ash (%wt db) | Oxygen (%wt db) | Molar H/C Ratio |
|---|---|---|---|---|---|---|---|---|---|---|
| 5 | Bio-oil | 25-40 % | 31.87 | 69.25 | 7.43 | 3.70 | 0.42 | 10.39 | 8.82 | 1.28 |
| 6 | Bio-oil | 25-40 % | 38.86 | 78.98 | 6.77 | 0.18 | 0.07 | - | 14.00 | 1.02 |
| 7 | Bio-oil | 25-40 % | 35.93 | 78.64 | 6.86 | 0.17 | 0.03 | - | 14.30 | 1.04 |
| 8 | Bio-oil | 25-40 % | 34.93 | 78.87 | 7.20 | 0.20 | 0.04 | 1.70 | 11.99 | 1.09 |
| 9 | Bio-oil | 25-40 % | 34.86 | 79.09 | 7.02 | 0.16 | 0.03 | 1.02 | 12.67 | 1.06 |
| 10 | Bio-oil | 25-40 % | 34.16 | 77.95 | 7.19 | 0.18 | 0.03 | 0.70 | 13.95 | 1.10 |
| 11 | Bio-oil | 25-40 % | 34.74 | 78.91 | 7.39 | 0.11 | 0.04 | 1.10 | 12.45 | 1.12 |
| 12 | Bio-oil | 25-40 % | 31.56 | 71.84 | 6.99 | 0.14 | 0.07 | 0.30 | 20.65 | 1.16 |
| 13 | Bio-oil | 25-40 % | 30.49 | 69.90 | 6.69 | 0.09 | 0.03 | 0.10 | 23.19 | 1.14 |
| 14 | Bio-oil | 25-40 % | 31.97 | 73.50 | 6.88 | 0.08 | 0.03 | 0.10 | 19.42 | 1.11 |
| 15 | Bio-oil | 25-40 % | 30.37 | 69.37 | 6.69 | 0.10 | 0.02 | 0.10 | 23.72 | 1.15 |
| 16 | Bio-oil | 25-40 % | 31.78 | 73.08 | 6.79 | 0.11 | 0.02 | 0.20 | 19.80 | 1.11 |
| 17 | Bio-oil | 25-40 % | 32.20 | 74.94 | 6.79 | 0.14 | - | - | 18.13 | 1.08 |
| 18 | Bio-oil | 25-40 % | 33.14 | 74.92 | 6.58 | 0.11 | - | - | 18.39 | 1.05 |
| 19 | Bio-oil | 25-40 % | 35.15 | 81.22 | 7.19 | 0.06 | 0.02 | 1.20 | 10.30 | 1.06 |
| 20 | Bio-oil | 25-40 % | 35.50 | 82.33 | 7.19 | 0.08 | 0.01 | 0.30 | 10.09 | 1.04 |

Figure 11 (continued).

Table 5 (Continued): analysis of lignocellulosic matter-derived bio-oil product

| Sample No. | SiO2 (%wt db) | Al2O3 (%wt db) | Fe2O3 (%wt db) | TiO2 (%wt db) | K2O (%wt db) | MgO (%wt db) | Na2O (%wt db) | Ash Constituents CaO (%wt db) | SO3 (%wt db) | P2O5 (%wt db) | Mn3O4 (%wt db) | SrO (%wt db) | BaO (%wt db) | ZnO (%wt db) | V2O5 (%wt db) |
|---|---|---|---|---|---|---|---|---|---|---|---|---|---|---|---|
| 5 | 6.20 | 1.70 | 7.40 | 0.36 | 0.36 | 5.00 | 0.60 | 40.60 | 4.30 | 34.60 | | | | | |
| 6 | | | | | | | | | | | | | | | |
| 7 | | | | | | | | | | | | | | | |
| 8 | 9.60 | 8.40 | 7.80 | 0.21 | 0.56 | 5.30 | 34.50 | 20.80 | 3.50 | 8.10 | | | | | |
| 9 | 15.30 | 12.10 | 14.50 | 0.49 | 0.40 | 9.90 | 2.20 | 28.00 | 6.10 | 13.10 | | | | | |
| 10 | | | | | | | | | | | | | | | |
| 11 | | | | | | | | | | | | | | | |
| 12 | | | | | | | | | | | | | | | |
| 13 | | | | | | | | | | | | | | | |
| 14 | | | | | | | | | | | | | | | |
| 15 | | | | | | | | | | | | | | | |
| 16 | | | | | | | | | | | | | | | |
| 17 | | | | | | | | | | | | | | | |
| 18 | | | | | | | | | | | | | | | |
| 19 | | | | | | | | | | | | | | | |
| 20 | | | | | | | | | | | | | | | |

Figure 11 (continued).

METHODS FOR BIOFUEL PRODUCTION

This application is a US national phase of International Application No. PCT/AU2011/000404 filed on Apr. 7, 2011, the disclosure of which is incorporated herein by reference in its entirety.

TECHNICAL FIELD

The invention relates generally to the field of biofuel production. More specifically, the invention relates to methods for the production of biofuels from organic matter. The invention also relates to biofuel products obtainable by the methods.

BACKGROUND

The global demand for energy continues to rise while reserves of conventional petroleum (e.g. oil, gas, and natural gas liquids) are in decline. A peak in oil production imposed by dwindling petroleum reserves raises the possibility of a global energy crisis, particularly if the demand for energy continues to rise as predicted. Hence, there is increased focus on the exploitation of previously unconventional fuel resources (e.g. heavy oil, oil sands, oil shale) and other non-fossil sources of energy (e.g. lignocellulosic materials).

A significant amount of research in the field of "alternative" energy production has focussed on the generation of biofuels from lignocellulosic matter. This technology raises the prospect of a shift to an abundant and renewable feedstock for energy production as an alternative to the depleting reserves of hydrocarbon-based raw materials. The enrichment of low energy density fossil fuels (e.g. lignite, peat and oil shale) into high energy fuel products also represents an attractive alternative given the relative abundance of those resources.

Despite having considerable potential most techniques for the production of fuels from lignocellulosic matter or other non-conventional materials are poorly cost-efficient and/or fail to provide fuel products of adequate quality to be commercially viable. For example, current processes for the production of biofuels from lignocellulosic matter usually require separation of the substrate into various different components via a series of complex and time-consuming steps, and in many cases require the use of expensive hydrolytic enzymes and fermenting microorganisms. In addition to these disadvantages, currently available processes fail to utilise a significant proportion of the substrate material which is not converted into fuel and goes to waste. Moreover, the fuels produced by current processes typically comprise a significantly higher oxygen content than conventional fuels. Hence, their energy density is comparatively low and their poor stability makes processing (e.g. storage, blending with conventional fuels, upgrading) difficult.

A need exists for improved methods of producing biofuels from organic matter that avoid one or more of the disadvantages stated above.

SUMMARY OF THE INVENTION

In a first aspect, the invention provides a method for producing a biofuel, the method comprising treating organic matter with an aqueous solvent and at least one additional catalyst at a temperature of between about 250° C. and about 400° C., and a pressure of between about 100 bar and about 300 bar.

In a second aspect, the invention provides a method for producing a biofuel, the method comprising:
providing a reaction mixture comprising organic matter and an aqueous solvent, and;
treating said reaction mixture at a temperature of between about 250° C. and about 400° C., and a pressure of between about 100 bar and about 300 bar in a reaction vessel;
wherein said reaction mixture comprises at least one additional catalyst that originates independently of other reaction mixture components and of said reaction vessel.

In one embodiment of the first and second aspect, the additional catalyst is not present, or is substantially not present, in any one or more of the organic matter, the aqueous solvent, or a reactor vessel wall.

In another embodiment of the first and second aspect, the additional catalyst is also present in any one or more of the organic matter, the aqueous solvent, or a reactor vessel wall.

In one embodiment of the first and second aspect, the additional catalyst is an additional base catalyst.

In one embodiment of the first and second aspect, the additional base catalyst is an alkali metal hydroxide catalyst or a transition metal hydroxide catalyst.

In one embodiment of the first and second aspect, the additional base catalyst is sodium hydroxide or potassium hydroxide.

In one embodiment of the first and second aspect, the biofuel is an oil product.

In one embodiment of the first and second aspect, the biofuel is a bio-oil.

In one embodiment of the first and second aspect, the bio-oil is derived from processing fossilised organic material (e.g. coals such as lignite).

In one embodiment of the first and second aspect, the bio-oil is derived from non-fossilised organic material (e.g. lignocellulosic matter).

In another embodiment of the first and second aspect, the organic matter and aqueous solvent is treated in the form of a slurry.

In another embodiment of the first and second aspect, the treating is performed under conditions of continuous flow.

In another embodiment of the first and second aspect, the slurry is subjected to:
(a) heating and pressurisation to a target temperature and pressure,
(b) treatment at target temperature(s) and pressure(s) for a defined time period (i.e. the "retention time"), and
(c) cooling and de-pressurisation,
under continuous flow conditions.

In another embodiment of the first and second aspect, the minimum (volume-independent) flow velocity of the slurry under said continuous flow conditions is greater than the settling velocity of solid matter within the slurry.

In another embodiment of the first and second aspect, the minimum (volume-independent) flow velocity of the slurry under said continuous flow conditions is above 0.01 cm/s.

In another embodiment of the first and second aspect, the minimum (volume-independent) flow velocity of the slurry under said continuous flow conditions is above 0.05 cm/s.

In another embodiment of the first and second aspect, the minimum (volume-independent) flow velocity of the slurry under said continuous flow conditions is above about 0.5 cm/s.

In another embodiment of the first and second aspect, the minimum (volume-independent) flow velocity of the slurry under said continuous flow conditions is above about 1.5 cm/s.

In a further embodiment of the first and second aspect, the treating comprises use of at least one additional catalyst that enhances incorporation of hydrogen into the organic matter.

In one embodiment of the first and second aspect, the additional catalyst that enhances the incorporation of hydrogen into the organic matter is selected from the group consisting of alkali metal formate catalysts, transition metal formate catalysts, reactive carboxylic acid catalysts, transition metal catalysts, sulphide catalysts, noble metal catalysts, water-gas-shift catalysts, and combinations thereof.

In one embodiment of the first and second aspect, the additional catalyst that enhances the incorporation of hydrogen into the organic matter is sodium formate.

In a further embodiment of the first and second aspect, the treating comprises use of at least one further additional catalyst that enhances removal of oxygen from the organic matter.

In a further embodiment of the first and second aspect, the further additional catalyst originates independently of other reaction mixture components and said reaction vessel.

In one embodiment of the first and second aspect, the additional catalyst that enhances the removal of oxygen from the organic matter is selected from the group consisting of acid catalysts, transition metal catalysts, noble metal catalysts, supported transition metal catalysts, solid acid catalysts, and mixtures thereof.

In one embodiment of the first and second aspect, the organic matter is fossilised organic matter having a carbon content of at least 50%, and the aqueous solvent is water.

In another embodiment of the first and second aspect, the organic matter is fossilised organic matter having a carbon content of at least 60%, and the aqueous solvent is water.

In another embodiment of the first and second aspect, the temperature is between about 320° C. and about 360° C., and the pressure is between about 200 bar and about 250 bar.

In another embodiment of the first and second aspect, the fossilised organic matter is lignite, the temperature is between about 340° C. and about 360° C., and the pressure is between about 200 bar and about 240 bar.

In one embodiment of the first and second aspect, the biofuel comprises one or more of an oil component, a char component and a gaseous component comprising methane, hydrogen, carbon monoxide and carbon dioxide.

In one embodiment of the first and second aspect, the organic matter is lignocellulosic matter, and the aqueous solvent comprises alcohol.

In one embodiment of the first and second aspect, the lignocellulosic matter comprises more than about 10% of each of lignin, cellulose, and hemicellulose.

In another embodiment of the first and second aspect, the temperature is between about 270° C. and about 360° C., the pressure is between about 170 bar and about 250 bar, and the solvent comprises between about 5% and 40% alcohol by weight.

In one embodiment of the first and second aspect, the organic matter is lignocellulosic matter, the temperature is between about 300° C. and about 340° C., the pressure is between about 200 bar and about 240 bar, and the solvent comprises between about 10% and about 30% alcohol by weight.

In one embodiment of the first and second aspect, the alcohol is ethanol.

In one embodiment of the first and second aspect, the treating is for a time period of between about 20 minutes and about 30 minutes.

In another embodiment of the first and second aspect, the method comprises the step of heating the organic matter and aqueous solvent to said temperature in a time period of less than about 2 minutes, prior to said treating.

In another embodiment of the first and second aspect, the method comprises the step of heating and pressurising the organic matter and aqueous solvent to said temperature and pressure in a time period of less than about 2 minutes, prior to said treating.

In another embodiment of the first and second aspect, the:
(i) additional catalyst,
(ii) additional catalyst that enhances the incorporation of hydrogen into the organic matter; and/or
(iii) additional catalyst that enhances the removal of oxygen from the organic matter,
added to the organic matter after said heating and said pressurising.

In another embodiment of the first and second aspect, the:
(i) additional catalyst,
(ii) additional catalyst that enhances the incorporation of hydrogen into the organic matter; and/or
(iii) additional catalyst that enhances the removal of oxygen from the organic matter,
is added to the organic matter after said heating and said pressurising and prior to said treating.

In another embodiment of the first and second aspect, the organic matter is lignite, and the
(i) additional catalyst,
(ii) additional catalyst that enhances the incorporation of hydrogen into the organic matter; and/or
(iii) additional catalyst that enhances the removal of oxygen from the organic matter,
is added to the organic matter when said temperature is greater than about 340° C. and said pressure is greater than about 230 bar.

In another embodiment of the first and second aspect, the organic matter is lignocellulosic matter, and the
(i) additional catalyst,
(ii) additional catalyst that enhances the incorporation of hydrogen into the organic matter; and/or
(iii) additional catalyst that enhances the removal of oxygen from the organic matter,
is added to the organic matter when said temperature is greater than about 310° C. and said pressure is greater than about 180 bar.

In another embodiment of the first and second aspect, the method comprises the steps of:
(i) cooling the organic matter to a temperature of between about 160° C. and about 200° C. in a time period of less than about 30 seconds after said treating; and
(ii) depressurisation and cooling the organic matter to ambient temperature by release through a pressure let down device.

In another embodiment of the first and second aspect, the pressure let down device is enveloped in ambient temperature water.

In one embodiment of the first and second aspect, the biofuel comprises an oil component having a gross calorific value of more than 35 MJ/kg.

In one embodiment of the first and second aspect, the biofuel comprises an oil component having greater than about 8% wt db hydrogen and less than about 10% wt db oxygen.

In one embodiment of the first and second aspect, the biofuel comprises a char component having a gross calorific value of more than 30 MJ/kg.

In a third aspect, the invention provides a biofuel produced by the method of the first or second aspect.

In one embodiment of the third aspect, the biofuel is an oil product.

In one embodiment of the third aspect, the biofuel is a bio-oil.

In one embodiment of the third aspect, the bio-oil is derived from processing fossilised organic material (e.g. coals such as lignite).

In one embodiment of the third aspect, the bio-oil is derived from non-fossilised organic material (e.g. lignocellulosic matter).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Preferred embodiments of the present invention will now be described, by way of an example only, with reference to the accompanying drawings wherein:

FIG. 8 shows Table 1.

FIG. 9 shows Table 4a.

FIG. 10 shows Table 4b.

FIG. 11 shows Table 5.

DEFINITIONS

Figure 1:
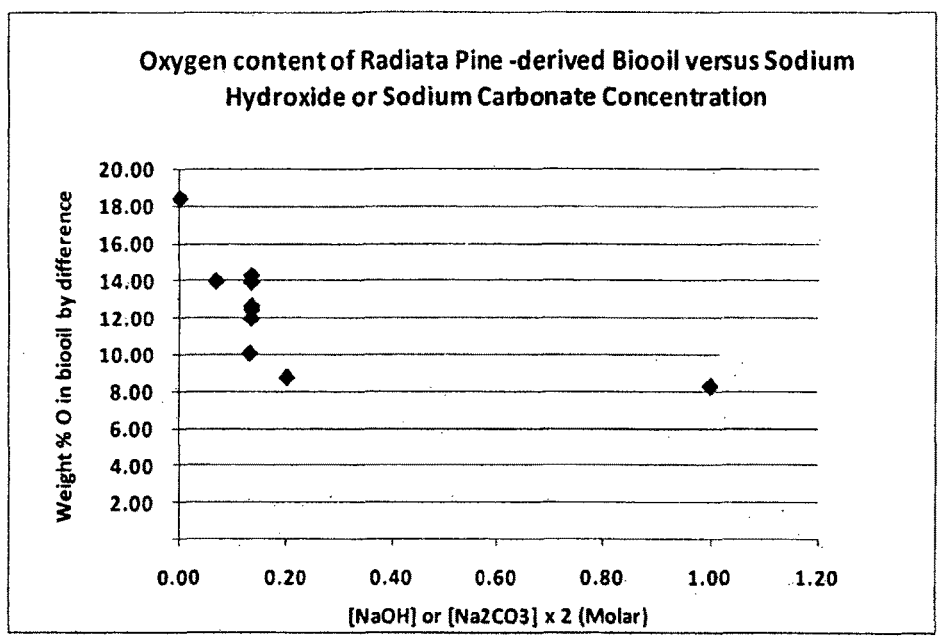
FIG. 1 is a graph showing weight percent oxygen in lignocellulosic biomass derived oil versus sodium concentration (moles per liter) (reaction conditions: 25 minutes residence time, 320-350° C., 240 bar).

As used herein, the singular forms "a", "an" and "the" include plural references unless the context clearly dictates otherwise. For example, the term "a catalyst" also includes a plurality of catalysts.

As used herein, the term "comprising" means "including". Variations of the word "comprising", such as "comprise" and "comprises", have correspondingly varied meanings. Thus, for example, a material "comprising" lignin and cellulose may consist exclusively of lignin and cellulose or may include other additional substances.

As used herein, the term "intrinsic catalyst" will be understood to be a catalyst that is innately present in a given reaction component such as, for example, any one or more of organic matter feedstock, an aqueous solvent, and/or vessel walls of a reactor apparatus.

As used herein, the term "additional catalyst" will be understood to mean a catalyst that is supplied supplementary to catalyst(s) which are intrinsically present in other components of a given reaction (e.g. intrinsic catalysts present in organic matter, aqueous solvent and/or walls of a reactor apparatus).

As used herein, the terms "organic matter" and "organic materials" have the same meaning and encompass any material comprising carbon including both fossilised and non-fossilised materials. Non-limiting examples of organic matter include biomass, lignocellulosic matter, and hydrocarbon-containing materials (e.g. lignite, oil shale and peat).

As used herein, the term "biofuel" refers to an energy-containing material derived from the processing of organic matter. Non-limiting examples of biofuels include oil products (i.e. bio-oils), char products (otherwise known as upgraded pulvarised coal injection (PCI) equivalent products), gaseous products, biodiesel, and alcohols (e.g. ethanol and butanol).

As used herein, the term "bio-oil" will be understood to encompass oil products derived from processing fossilised organic material (e.g. coals such as lignite), non-fossilised organic material (e.g. lignocellulosic matter), or mixtures thereof.

As used herein, the terms "lignocellulosic matter" and "lignocellulosic biomass" are used interchangeably and have the same meaning. The terms encompass any substance comprising lignin, cellulose, and hemicellulose.

As used herein, the term "aqueous solvent" refers to a solvent comprising at least one percent water based on total weight of solvent. An "aqueous solvent" may therefore comprise between one percent water and one hundred percent water based on total weight of solvent.

As used herein, the term "aqueous alcohol" refers to a solvent comprising at least one percent alcohol based on total weight of solvent.

As used herein, the term "aqueous ethanol" refers to a solvent comprising at least one percent ethanol based on total weight of solvent.

As used herein, the term "aqueous methanol" refers to a solvent comprising at least one percent methanol based on total weight of solvent.

As used herein, a "supercritical" substance (e.g. a supercritical solvent) refers to a substance that is heated above its critical temperature and pressurised above its critical pressure (i.e. a substance at a temperature and pressure above its critical point).

It will be understood that use of the term "about" herein in reference to a recited numerical value (e.g. a temperature or pressure) includes the recited numerical value and numerical values within plus or minus ten percent of the recited value.

It will be understood that use of the term "between" herein when referring to a range of numerical values encompasses the numerical values at each endpoint of the range. For example, a temperature range of between 10° C. and 15° C. is inclusive of the temperatures 10° C. and 15° C.

Any description of a prior art document herein, or a statement herein derived from or based on that document, is not an admission that the document or derived statement is a part of the common general knowledge of the relevant art.

For the purposes of description all documents referred to herein are incorporated by reference in their entirety unless otherwise stated.

DETAILED DESCRIPTION OF THE INVENTION

Current techniques for biofuel production suffer from a number of deficiencies. The majority involve a series of complex reaction stages often requiring the addition of expensive reagents (e.g. hydrolytic enzymes). In addition, many fail to efficiently utilise/convert a significant proportion of raw input material. More significantly, biofuels generated by current techniques generally have a significantly increased oxygen content compared to conventional fuels which reduces their energy value and stability. Hence, these biofuels are difficult to store and/or process for downstream applications (e.g. blending with conventional fuels, upgrading). In light of these and other limitations, few currently available biofuel production techniques provide a commercially viable alternative to using conventional fuels.

Certain aspects of the present invention provide methods for the production of biofuels from organic matter. In contrast to existing techniques, the biofuel production methods described herein comprise a single stage in which organic substrate material in converted into a biofuel. No separation of substrate material into different components is required prior to performing the methods of the invention. In addition, the methods do not require the use of hydrolytic enzymes or microorganisms to ferment sugars. Rather, substrate material mixed with aqueous solvent is subjected to a single stage of treatment under conditions of increased temperature and pressure and optionally in the presence of specific catalysts to produce a biofuel product. Without being limited to a particular mode of action, it is postulated that the inclusion of the catalysts assist in maintaining a reducing environment driving a series of reactions in which the substrate material is decomposed and altered by the reduction of oxygen and incorporation of hydrogen.

Certain aspects of the invention relate to biofuels produced by the methods of the present invention. The biofuels are characterised by low oxygen content, high energy density and/or increased stability in comparison to those produced by currently available methods. Accordingly, biofuels of the invention are more suitable for storage and/or blending with conventional fuels (e.g. diesel), and more easily upgraded into higher quality fuel products (if required).

Organic Matter

The present invention provides methods for the conversion of organic matter into biofuel. As used herein, "organic matter" (also referred to herein as "organic material") encompasses any matter comprising carbon, including both fossilised and non-fossilised forms of carbon-comprising matter.

No limitation exists regarding the particular type of organic matter utilised in the methods of the invention, although it is contemplated that certain forms of organic matter may be more suitable than others.

Organic matter utilised in the methods of the invention may be naturally occurring organic materials (e.g. lignocellulosic biomass or fossil fuel materials including lignite, oil shale, peat and the like) or synthetic organic materials (e.g. synthetic rubbers, plastics, nylons and the like).

Organic matter utilised in the methods of the invention may be fossilised organic material (e.g. lignite), non-fossilised organic material (e.g. lignocellulosic matter), or a mixture thereof.

It will be understood that the organic material may comprise mixtures of two or more different types of naturally-occurring organic materials, two or more different types of synthetic organic materials, or a mixture of naturally-occurring and synthetic organic materials. No limitation exists regarding the particular proportion of different components within the mixture.

In some preferred embodiments, organic matter utilised in the methods of the invention comprises fossilised organic matter. "Fossilised organic matter" as contemplated herein encompasses any organic material that has been subjected to geothermal pressure and temperature for a period of time sufficient to remove water and concentrate carbon to significant levels. For example, fossilised organic material may comprise more than about 10%, 20%, 30%, 40%, 50%, 60%, 70%, 75%, 80%, 85%, 90% or 95 wt % carbon. Preferably, the fossilised organic material may comprise more than about 50 wt % carbon, more than about 60 wt % carbon, or more than about 70% weight carbon. Non-limiting examples of such materials include coals (e.g. anthracitic coals such as meta-anthracite, anthracite and semianthracite; bituminous coals; subbituminous coals; lignite (i.e. brown coal), coking coal, coal tar, coal tar derivatives, coal char), cokes (e.g. high temperature coke, foundry coke, low and medium temperature coke, pitch coke, petroleum coke, coke oven coke, coke breeze, gas coke, brown coal coke, semi coke), peat (e.g. milled peat, sod peat), kerogen, tar sands, oil shale, shale tar, asphalts, asphaltines, natural bitumen, bituminous sands, or any combination thereof.

In other preferred embodiments, organic matter utilised in the methods of the invention comprises lignocellulosic matter. As used herein, "lignocellulosic matter" refers to any substance comprising lignin, cellulose and hemicellulose.

For example, the lignocellulosic matter may be a woody plant or component thereof. Examples of suitable woody plants include, but are not limited to, pine (e.g. *Pinus radiata*), birch, eucalyptus, bamboo, beech, spruce, fir, cedar, poplar, willow and aspen. The woody plants may be coppiced woody plants (e.g. coppiced willow, coppiced aspen).

Additionally or alternatively, the lignocellulosic matter may be a fibrous plant or a component thereof. Non-limiting examples of fibrous plants (or components thereof) include grasses (e.g. switchgrass), grass clippings, flax, corn cobs, corn stover, reed, bamboo, bagasse, hemp, sisal, jute, cannibas, hemp, straw, wheat straw, abaca, cotton plant, kenaf, rice hulls, and coconut hair.

Additionally or alternatively, the lignocellulosic matter may be derived from an agricultural source. Non-limiting examples of lignocellulosic matter from agricultural sources include agricultural crops, agricultural crop residues, and grain processing facility wastes (e.g. wheat/oat hulls, corn fines etc.). In general, lignocellulosic matter from agricultural sources may include hard woods, soft woods, hardwood stems, softwood stems, nut shells, branches, bushes, canes, corn, corn stover, cornhusks, energy crops, forests, fruits, flowers, grains, grasses, herbaceous crops, wheat straw, switchgrass, salix, sugarcane bagasse, cotton seed hairs, leaves, bark, needles, logs, roots, saplings, short rotation woody crops, shrubs, switch grasses, trees, vines, cattle manure, and swine waste.

Additionally or alternatively, lignocellulosic matter may be derived from commercial or virgin forests (e.g. trees, saplings, forestry or timber processing residue, scrap wood such as branches, leaves, bark, logs, roots, leaves and products derived from the processing of such materials, waste or byproduct streams from wood products, sawmill and paper mill discards and off-cuts, sawdust, and particle boar).

Additionally or alternatively, industrial products and by-products may be used as a source of lignocellulosic matter. Non-limiting examples include wood-related materials and woody wastes and industrial products (e.g. pulp, paper (e.g. newspaper) papermaking sludge, cardboard, textiles and cloths, dextran, and rayon).

It will be understood that organic material used in the methods of the invention may comprise a mixture of two or more different types of lignocellulosic matter, including any combination of the specific examples provided above.

The relative proportion of lignin, hemicellulose and cellulose in a given sample will depend on the nature of the lignocellulosic matter.

By way of example only, the proportion of hemicellulose in a woody or fibrous plant used in the methods of the invention may be between about 15% and about 40%, the proportion of cellulose may be between about 30% and about 60%, and the proportion of lignin may be between about 5% and about 40%. Preferably, the proportion of hemicellulose in the woody or fibrous plant may be between about 23% and about 32%, the proportion of cellulose may be between about 38% and about 50%, and the proportion of lignin may be between about 15% and about 25%.

In some embodiments, lignocellulosic matter used in the methods of the invention may comprise between about 2% and about 35% lignin, between about 15% and about 45% cellulose, and between about 10% and about 35% hemicellulose.

In other embodiments, lignocellulosic matter used in the methods of the invention may comprise between about 20% and about 35% lignin, between about 20% and about 45% cellulose, and between about 20% and about 35% hemicellulose.

In some embodiments, the lignocellulosic matter may comprise more than about 5%, 10%, 15%, 20%, 25%, 30%, 35%, 40%, 45%, or 50% lignin.

In some embodiments, the lignocellulosic matter may comprise more than about 5%, 10%, 15%, 20%, 25%, 30%, 35%, 40%, 45%, or 50% cellulose.

In some embodiments, the lignocellulosic matter may comprise more than about 5%, 10%, 15%, 20%, 25%, 30%, 35%, 40%, 45%, or 50% hemicellulose.

The skilled addressee will recognize that the methods described herein are not constrained by the relative proportions of lignin, hemicellulose and cellulose in a given source of lignocellulosic matter.

Organic matter utilised in the methods of the invention may comprise a mixture of a fossilised organic matter and non-fossilised organic matter (e.g. lignocellulosic matter). Non-limiting examples of suitable fossilised and non-fossilised organic matter that may be included in the mixture are provided in the paragraphs above. It will be understood that no limitation exists regarding the relative proportion of the fossilised and non-fossilised organic matter in the mixture.

In certain embodiments of the invention, the mixture comprises lignite (brown coal) and lignocellulosic matter. The lignocellulosic matter of the mixture may, for example, comprise woody plant material and/or fibrous plant material. The proportion of lignite in the mixture may be greater than about 20%, 40%, 60% or 80%. Alternatively, the proportion of lignocellulosic matter in the mixture may be greater than about 20%, 40%, 60% or 80%.

In some preferred embodiments, organic matter utilised in the methods of the invention comprises carbon-containing polymeric materials, non-limiting examples of which include rubbers (e.g. tyres), plastics and polyamides (e.g. nylons).

Non-limiting examples of suitable rubbers include natural and synthetic rubbers such as polyurethanes, styrene rubbers, neoprenes, polybutadiene, fluororubbers, butyl rubbers, silicone rubbers, plantation rubber, acrylate rubbers, thiokols, and nitrile rubbers.

Non-limiting examples of suitable plastics include PVC, polyethylene, polystyrene, terphtalate, polyethylene and polypropylene.

Organic matter utilised in the methods of the invention may comprise carbon-containing wastes such as sewage, manure, or household or industrial waste materials.

Pre-Treatment of Organic Matter

Organic matter utilised in the methods of the invention may optionally be pre-treated prior to performing the conversion of the matter to biofuel.

It will be recognised that no strict requirement exists to perform a pre-treatment step when using the methods of the invention. For example, pre-treatment of the organic matter may not be required if it is obtained in the form of a liquid or in a particulate form. However, it is contemplated that in many cases pre-treatment of the organic matter may be advantageous in enhancing the outcome of the biofuel production methods described herein.

In general, pre-treatment may be used to break down the physical and/or chemical structure of the organic matter making it more accessible to various reagents utilised in the methods of the invention (e.g. aqueous solvent, catalysts) and/or other reaction parameters (e.g. heat and pressure). In certain embodiments, pre-treatment of organic matter may be performed for the purpose of increasing solubility, increasing porosity and/or reducing the crystallinity of sugar components (e.g. cellulose). Pre-treatment of the organic matter may be performed using an apparatus such as, for example, an extruder, a pressurized vessel, or batch reactor.

Pre-treatment of the organic matter may comprise physical methods, non-limiting examples of which include grinding, chipping, shredding, milling (e.g. vibratory ball milling), compression/expansion, agitation, and/or pulse-electric field (PEF) treatment.

Additionally or alternatively, pre-treatment of the organic matter may comprise physio-chemical methods, non-limiting examples of which include pyrolysis, steam explosion, ammonia fiber explosion (AFEX), ammonia recycle percolation (ARP), and/or carbon-dioxide explosion. For example, steam explosion involves exposing the organic matter to high pressure steam in a contained environment before the resulting product is explosively discharged to an atmospheric pressure. Pre-treatment with steam explosion may additionally involve agitation of the organic matter.

Additionally or alternatively, pre-treatment of the organic matter may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), oxidative delignification (i.e. lignin biodegradation catalysed by the peroxidase enzyme in the presence of $H_2O_2$), and/or the organosolvation method (i.e. use of an organic solvent mixture with inorganic acid catalysts such as $H_2SO_4$ and/or HCl to break lignin-hemicellulose bonds).

Additionally or alternatively, pre-treatment of the organic matter may comprise biological methods, non-limiting examples of which include the addition of microorganisms (e.g. rot fungi) capable of degrading/decomposing various component(s) of the organic matter.

In preferred embodiments, organic matter used in the methods of the invention is provided in the form of a slurry. The slurry may be generated, for example, by generating a particulate form of the organic matter (e.g. by physical methods such as those referred to above and/or by other means) and mixing with an appropriate liquid (e.g. an aqueous solvent).

The optimal particle size of solid components and the optimal concentration of solids in the slurry may depend upon factors such as, for example, the heat transfer capacity of the organic matter utilised (i.e. the rate at which heat can be transferred into and through individual particles), the desired rheological properties of the slurry and/or the compatibility of the slurry with component/s of a given apparatus within which the methods of the invention may be performed (e.g. reactor tubing). The optimal particle size and/or concentration of solid components in a slurry used for the methods of the invention can readily be determined by a person skilled in the art using standard techniques. For example, a series of slurries may be generated, each sample in the series comprising different particle sizes and/or different concentrations of solid components compared to the other samples. Each slurry can then be treated in accordance with the methods of the invention under a conserved set of reaction conditions. The optimal particle size and/or concentration of solid components can then be determined upon analysis and comparison of the products generated from each slurry using standard techniques in the art.

In certain embodiments of the invention, the particle size of solid components in the slurry may be between about 10 microns and about 10,000 microns. For example, the particle size may be more than about 50, 100, 500, 750, 1000, 2000, 3000, 4000, 5000, 6000, 7000, 8000 or 9000 microns. Alternatively, the particle size may less than about 50, 100, 500, 750, 1000, 2000, 3000, 4000, 5000, 6000, 7000, 8000 or 9000 microns. In some embodiments, the particle size is between about 10 microns and about 50 microns, between about 10 microns and about 100 microns, between about 10 microns and about 200 microns, between about 10 microns and about 500 microns, between about 10 microns and about 750 microns, or between about 10 microns and about 1000 microns. In other embodiments, the particle size is between about between about 100 microns and about 1000 microns, between about 100 microns and about 750 microns, between about 100 microns and about 500 microns, or between about 100 microns and about 250 microns.

In certain embodiments of the invention, the concentration of solid matter in the slurry may be above about 50% w/v. Alternatively, the concentration of solid matter may be less than about 50%, less than about 40%, less than about 30%, less than about 20%, less than about 10%, or less than about 5% w/v. In some embodiments, the concentration of solid matter is between about 2% and about 30%, between about 2% and about 20%, between about 2% and about 10%, between about 5% and about 10%, between about 5% and about 20%, or between about 1% and about 10% w/v.

In some embodiments, organic matter used in the methods of the invention is lignocellulosic matter subjected to an optional pre-treatment step in which hemicellulose is extracted. Accordingly, the majority of the hemicellulose (or indeed all of the hemicellulose) may be extracted from the lignocellulosic matter and the remaining material (containing predominantly cellulose and lignin) used to produce a biofuel by the methods of the invention. However, it will be understood that this pre-treatment is optional and no requirement exists to separate hemicellulose from lignocellulosic matter when performing the methods of the invention. Suitable methods for the separation of hemicellulose from lignocellulosic matter are described, for example, in PCT publication number WO/2010/034055, the entire contents of which are incorporated herein by reference.

For example, the hemicellulose may be extracted from lignocellulosic matter by subjecting a slurry comprising the lignocellulosic matter (e.g. 5%-15% w/v solid concentration) to treatment with a mild aqueous acid (e.g. pH 6.5-6.9) at a temperature of between about 100° C. and about 250° C., a reaction pressure of between about 2 and about 50 atmospheres, for between about 5 and about 20 minutes. The solubilised hemicellulose component may be separated from the remaining solid matter (containing predominantly cellulose and lignin) using any suitable means (e.g. by use of an appropriately sized filter). The remaining solid matter may be used directly in the methods of the invention, or alternatively mixed with one or more other forms of organic matter (e.g. lignite) for use in the methods of the invention.

Biofuel Production

The methods of the invention provide a means of generating a biofuel from organic matter. In general, the methods require treatment of the organic matter with an aqueous solvent under conditions of increased temperature and pressure and optionally in the presence of catalysts which maintain a reducing environment.

Putative Reaction Mechanisms

Without limitation to particular mechanistic description, it is believed that organic matter used in the methods of the invention is decomposed (i.e. solid to liquid transformation) primarily by acid- and/or base-catalysed hydrolysis. The hydrolysis reactions may be mediated by aqueous cations (hydronium) and anions (hydroxide) dissociated from water molecules under increased temperature and pressure. Hydrolysis of the organic substrate may also be enhanced by the inclusion of additional acid and/or base catalysts to the mix of organic matter and aqueous solvent. Exemplary reactions that may be involved in hydrolysis of the material include the conversion of glycosidic and/or ether linkages of the organic matter into alcohols, and the conversion of esters of the organic matter to carboxylic acids and alcohols.

In certain embodiments, aqueous solvents used in the methods of the invention are aqueous alcohols. It is postulated that under increased temperature and pressure alcohols present in the solvent may decompose solid organic matter by alcoholysis. Additional roles of alcohols (if present) in the aqueous solvent may include swelling of the organic matter to induce greater reactivity, and/or the removal of hydrolysed species from the surface of the matter to expose fresh surface that can hydrolyse further (thereby increasing overall yield). Alcohols in the aqueous solvent may also act as radical modifiers reducing the occurrence and/or severity of undesirable radical side reactions (e.g. polymerisations).

It is also postulated that the conversion of organic matter into biofuel by the methods of the invention involves removal of oxygen from the matter. Again without being bound to particular mechanistic pathways, it is believed that the inclusion of specific catalysts in the mixture of aqueous solvent and organic matter under treatment and/or thermal catalysis of the matter facilitates elimination (dehydration) reactions (i.e. elimination of water to give double bonds), decarboxylation reactions (i.e. removal of carboxyl group(s) from compounds of the organic matter as carbon dioxide), and/or decarbonylation reactions (i.e. removal of carbon monoxide from aldehydes), each of which may assist in removing oxygen from compounds present in the organic matter under treatment.

Additionally, hydrogenation of compounds in the organic matter is also a postulated mechanism contributing to conversion of the organic matter to biofuel. Hydrogenation may be facilitated by specific catalysts added to the mixture of aqueous solvent and organic matter under treatment. Without limitation to particular mechanisms, the catalysts are proposed to enhance:

(i) transfer hydrogenation of aldehydes, ketones and/or unsaturated or aromatic systems in compounds of the organic matter to yield alcohols (from which oxygen can then be removed by dehydration, i.e. the elimination of water) and saturated moities; and/or
(ii) direct hydrogenation of aldehydes, ketones and/or unsaturated or aromatic systems to yield alcohols (which can then be eliminated by removal of oxygen) and saturated moities.

The hydrogenation and subsequent dehydration may occur in a cascade reaction system (referred to as hydrodeoxygenation).

It is believed that hydrogen in the system may be made available by gasification of the organic matter (and alcohols in the aqueous solvent if present), yielding a mixture of hydrogen, carbon monoxide and water, the latter two may then undergo the water-gas-shift reaction to form molecular hydrogen and carbon dioxide. In addition, carbon monoxide arising from gasification is thought to interact with specific catalysts (e.g. sodium hydroxide or potassium hydroxide) that may be added to the mixture of aqueous solvent and organic matter under treatment to form a formate (e.g. sodium formate or potassium formate). The formate so formed may act as a hydrogen transfer agent to facilitate the hydrogenation of compounds in the organic material. Other hydrogen transfer agents that might be generated via the decomposition of organic matter are low molecular weight acids, especially formic, acetic and oxalic acid.

Overall and again without limitation to particular modes of action, it is thought that partial gasification of reactive species in the presence of the catalysts described herein drives a cascade of interrelated reactions culminating in the generation of biofuel with high energy and stability.

In general, it is thought that the stability (and high energy content) of biofuels produced by the methods of the invention arise, at least in part, from the relatively low oxygen and high hydrogen content which reduces the degree of unsaturation (a starting point for undesired polymerisation leading to 'gumming up' of the material). In addition, it is considered that unsaturated or aromatic bonds present in the product may be less likely to be activated by neighbouring oxygen groups further reducing re-polymerisation potential.

Aqueous Solvents

Solvents used in accordance with the methods of the invention may be aqueous solvents. The specific nature of the aqueous solvent employed will depend on the form of organic matter utilised.

In certain embodiments, the solvent may be water. For example, it may be suitable or preferable to use water as the solvent when the organic matter used in the methods consists of or comprises a significant amount of fossilised organic matter (e.g. lignite, peat and the like).

It will be recognised that water may also be used as the solvent when other types of organic matter are treated using the methods of the invention, although in the case of some organic materials (e.g. lignocellulosic matter) the results may be sub-optimal.

In other embodiments, the aqueous solvent is an aqueous alcohol. For example, it may be suitable or preferable to use an aqueous alcohol as the solvent when the organic matter used in the methods consists of or comprises a significant amount of lignocellulosic material and/or other materials such rubber and plastics due to the stronger chemical bonds in these types of organic matter.

Suitable alcohols may comprise between one and about ten carbon atoms. Non-limiting examples of suitable alcohols include methanol, ethanol, isopropyl alcohol, isobutyl alcohol, pentyl alcohol, hexanol and iso-hexanol.

In certain embodiments, the solvent comprises a mixture of two or more aqueous alcohols.

Preferably, the alcohol is ethanol, methanol or a mixture thereof.

The aqueous alcohol will generally comprise at least one percent alcohol based on total weight of solvent. In certain embodiments, the aqueous alcohol comprises more than about 5%, 10%, 15%, 20%, 25%, 30%, 35%, 40%, 45% or 50% alcohol by weight. In other embodiments, the aqueous alcohol comprises less than about 5%, 10%, 15%, 20%, 25%, 30%, 35%, 40%, 45% or 50% alcohol by weight.

Preferably, the aqueous alcohol comprises between about 1% and about 50% alcohol by weight, about between 5% and about 50% alcohol by weight, between about 5% and about 40% alcohol by weight, between about 5% and about 30% alcohol by weight, between about 5% and about 20% alcohol by weight, between about 5% and about 10% alcohol by weight, between about 10% and about 50% alcohol by weight, between about 20% and about 50% alcohol by weight, between about 25% and about 50% alcohol by weight, or between about 30% and about 50% alcohol by weight.

In certain embodiments, the aqueous alcohol may act as an alkylating agent. Without limitation to particular mechanism(s) the transfer of an alkyl group from the aqueous alcohol to one or more components of the organic matter is thought to facilitate solvation and/or chemical stabilisation of the organic matter.

In preferred embodiments, an aqueous solvent used in the methods of the invention is aqueous methanol or aqueous ethanol.

In particularly preferred embodiments, the ethanol is aqueous ethanol. Preferably, the aqueous ethanol comprises between about 5% and about 30% ethanol by weight, more preferably between about 10% and about 25% ethanol by weight, and still more preferably between about 15% and about 25% ethanol by weight.

Temperature and Pressure

In accordance with the methods of the invention, organic matter may be treated with an aqueous solvent under conditions of increased temperature and pressure to produce biofuel.

The specific conditions of temperature and pressure used when practicing the methods of the invention may depend on a number different factors including, for example, the type of aqueous solvent used, the percentage of alcohol (if present) in the aqueous solvent, the type of organic matter under treatment, the physical form of the organic matter under treatment, the types of catalyst(s) utilised (if present) and their various concentration(s), the retention time, and/or the type of apparatus in which the methods are performed. These and other factors may be varied in order to optimise a given set of conditions so as to maximise the yield and/or reduce the processing time. In preferred embodiments, all or substantially all of the organic material used as a feedstock is converted into biofuel.

Desired reaction conditions may be achieved, for example, by conducting the reaction in a suitable apparatus (e.g. a sub/supercritical reactor apparatus) capable of maintaining increased temperature and increased pressure.

In certain embodiments an aqueous solvent used in the methods of the invention may be heated and pressurised beyond its critical temperature and/or beyond its critical pressure (i.e. beyond the 'critical point' of the solvent).

Accordingly, the aqueous solvent may be a 'supercritical' aqueous solvent if heated and pressurised beyond the 'critical point' of the solvent.

In certain embodiments an aqueous solvent used in the methods of the invention may be heated and pressurised to level(s) below its critical temperature and pressure (i.e. below the 'critical point' of the solvent). Accordingly, the aqueous solvent may be a 'subcritical' aqueous solvent if its maximum temperature and/or maximum pressure is below that of its 'critical point'. Preferably, the 'subcritical' aqueous solvent is heated and/or pressurised to level(s) approaching the 'critical point' of the solvent (e.g. between about 10° C. to about 50° C. below the critical temperature and/or between about 10 atmospheres to about 50 atmospheres below its critical pressure).

In some embodiments, an aqueous solvent used in the methods of the invention may be heated and pressurised to levels both above and below its critical temperature and pressure (i.e. heated and/or pressurised both above and below the 'critical point' of the solvent at different times). Accordingly, the aqueous solvent may oscillate between 'subcritical' and 'supercritical' states when performing the methods.

In some embodiments, an aqueous solvent used in the methods of the invention may be heated to a level above its critical temperature but pressurised to a level below its critical pressure. In other embodiments, an aqueous solvent used in the methods of the invention may be heated to a level below its critical temperature but pressurised to a level above its critical pressure.

Persons skilled in the art will understand that the critical temperature and critical pressure of a given aqueous solvent will depend, at least in part, on the percentage of water in the solvent. For example, if an aqueous solvent comprises a given percentage of water in combination with a given percentage of a second component having a lower critical point than water (e.g. an alcohol), the critical point of the solvent will generally be lower than that of pure water. Conversely, if an aqueous solvent comprises a given percentage of water in combination with a given percentage of a second component having a higher critical point than water, the critical point of the solvent will generally be higher than that of pure water.

In cases where an aqueous solvent comprises two core components (e.g. water and an alcohol), an approximately linear relationship may exist between the percentage of the alcohol present in the solvent and the critical temperature and pressure of the solvent, the end points being defined at one end by the critical point of pure water and at the other end by the critical point of the pure alcohol. For example, if the critical point of water is defined as 374° C. and 221 atm and the critical point of ethanol is defined as 240° C. and 60 atm, the critical point of a 25% aqueous ethanol solution may be approximately 340° C./180 atm, the critical point of a 50% aqueous ethanol solution may be approximately 307° C./140 atm, and the critical point of a 75% aqueous ethanol solution may be approximately 273° C./100 atm.

In cases where an aqueous solvent comprises more than two core components (e.g. water and two different types of alcohol), calculations of a similar nature may be used to determine the critical point of the solvent when the proportions of the various alcohols in the solvent are varied.

Accordingly, it will be understood that when a temperature and/or pressure (or a range of temperatures and/or pressures) is provided herein in relation to a given aqueous solvent comprising two or more core components in specified proportions (e.g. a 10% w/v aqueous alcohol), corresponding values/ranges of temperature and/or pressure may readily be derived when the relative proportions of the core components are varied.

It will also be understood that the critical point of a given aqueous solvent will be influenced by additional factors such as the chemical state of the organic material under treatment. For example, the critical point of a given aqueous solvent is likely to change over the course of a given reaction as feedstock material becomes solvated.

In certain embodiments, treatment of organic matter to produce biofuel using the methods of the invention may be conducted at temperature(s) of between about 200° C. and about 450° C. and pressure(s) of between about 50 bar and about 350 bar. In other embodiments, the treatment may be conducted at temperature(s) of between about 250° C. and about 400° C. and pressure(s) of between about 100 bar and about 300 bar. In additional embodiments, the treatment may be conducted at temperature(s) of between about 275° C. and about 375° C. and pressure(s) of between about 150 bar and about 275 bar. In some preferred embodiments, the treatment may be conducted at temperature(s) of between about 300° C. and about 375° C. and pressure(s) of between about 175 bar and about 275 bar. In other preferred embodiments, the treatment may be conducted at temperature(s) of between about 330° C. and about 360° C. and pressure(s) of between about 200 bar and about 250 bar. In still other preferred embodiments, the treatment may be conducted at temperature(s) of between about 340° C. and about 360° C. and pressure(s) of between about 200 bar and about 250 bar.

The skilled addressee will understand that a generally inverse relationship may exist between the temperature and/or pressure required to drive conversion of organic material into biofuel using the methods of the invention, and the proportion of additional component(s) (e.g. alcohol) combined with water in the aqueous solvent. For example, the use of an aqueous solvent comprising substantially water (i.e. in the absence of additional component(s) such as alcohol) may require increased temperature and/or pressure to drive conversion of the organic matter into biofuel compared to an aqueous solvent comprising a more substantial proportion of alcohol (which may require comparatively less temperature and/or pressure to drive the conversion). Accordingly, it would be readily apparent to the skilled addressee that increasing the proportion of, for example, alcohol (e.g. ethanol and/or methanol) in an aqueous solvent may allow a corresponding decrease in the temperature and/or pressure required to achieve efficient conversion of organic matter to biofuel using the methods of the invention. Conversely, it would be readily apparent that decreasing the proportion of, for example, alcohol (e.g. ethanol and/or methanol) in an aqueous solvent may require a corresponding increase in the temperature and/or pressure required to achieve efficient conversion of organic matter to biofuel using the methods of the invention.

It will also be recognised that various catalysts as described herein (see sub-section below entitled "Catalysts") may be used to increase the efficiency of the treatment which may in turn reduce the temperature and/or pressure required to drive conversion of the organic matter to biofuel using a given aqueous solvent.

Retention Time

The specific time period over which the conversion of organic matter may be achieved upon reaching a target temperature and pressure (i.e. the "retention time") may depend on a number different factors including, for example, the type of aqueous solvent used, the percentage of alcohol (if present) in the aqueous solvent, the type of organic matter under treatment, the physical form of the organic matter under treatment, the types of catalyst(s) (if present) in the mixture and their various concentration(s), and/or the type of apparatus in which the methods are performed. These and other factors may be varied in order to optimise a given method so as to maximise the yield and/or reduce the processing time. Preferably, the retention time is sufficient to covert all or substantially all of the organic material used as a feedstock into biofuel.

In certain embodiments, the retention time is less than about 60 minutes, 45 minutes, 30 minutes, 25 minutes, 20 minutes, 15 minutes, 10 minutes or 5 minutes. In certain embodiments, the retention time is more than about 60 minutes, 45 minutes, 30 minutes, 25 minutes, 20 minutes, 15 minutes, 10 minutes or 5 minutes. In other embodiments, the retention time is between about 1 minute and about 60 minutes. In additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

Persons skilled in the art will recognised that various catalysts as described herein (see sub-section below entitled "Catalysts") may be used to increase the efficiency of the treatment which may in turn reduce the retention time required to convert the organic matter into biofuel. Similarly, the retention time required may in some cases be less where the temperature and/or pressure is increased, and/or the proportion of additional component(s) (e.g. alcohol) in the aqueous solvent is increased.

The optimal retention time for a given set of reaction conditions as described herein may be readily determined by the skilled addressee by preparing and running a series of reactions that differ only by the retention time, and analysing the yield and/or quality of biofuel produced.

Heating/Cooling, Pressurisation/De-Pressurisation

A reaction mixture (e.g. in the form of a slurry) comprising organic matter, aqueous solvent and optionally one or more catalysts as defined herein may be brought to a target temperature and pressure (i.e. the temperature/pressure maintained for the "retention time") in a time period of between about 30 seconds and about 30 minutes. In some embodiments, the reaction mixture may be brought to a target temperature and pressure in less than about 5 minutes or less than about 2 minutes. Preferably, the reaction mixture is brought to a target temperature and pressure in less than about 2 minutes.

In certain embodiments, the reaction mixture may be brought to a target pressure substantially instantaneously and brought to a target temperature in less than 5 minutes. In other embodiments, the reaction mixture may be brought to a target pressure substantially instantaneously and brought to a target temperature in less than about two minutes. In other embodiments, the reaction mixture may be brought to a target pressure substantially instantaneously and brought to a target temperature in between about 1 and about 2 minutes.

Additionally or alternatively, following completion of the retention time period the reaction mixture may be cooled to between about 150° C. and about 200° C., between about 160° C. and about 200° C., preferably between about 170° C. and about 190° C., and more preferably about 180° C., in a time period of less than about 10 minutes, preferably less than about 7 minutes, more preferably less than about 6 minutes, preferably between about 4 and about 6 minutes, and more preferably about 5 minutes. Following the initial cooling period, the temperature may further reduced to ambient temperature with concurrent de-pressurisation by fast release into a cool aqueous medium (e.g. cooled water).

The processes of heating/pressurisation and cooling/de-pressurisation may be facilitated by performing the methods of the invention in a continuous flow system (see section below entitled "Continuous flow").

Catalysts

In accordance with the methods of the invention, organic matter may be treated with an aqueous solvent under conditions of increased temperature and pressure to produce a biofuel product. In certain embodiments, the organic matter may be treated with a supercritical aqueous solvent. In other embodiments the organic matter may be treated with a subcritical aqueous solvent. In either case, the treatment may be enhanced by the use of one or more additional catalysts. Although some catalysts may be an intrinsic component of the organic matter (e.g. minerals), aqueous solvent (e.g. hydronium/hydroxide ions of water under sub/supercritical conditions), and/or vessel walls of a reactor apparatus in which the organic matter may be treated (e.g. transition/noble metals), the invention contemplates the use of additional catalyst(s) to enhance the production of biofuel from organic material.

(i) "Additional" Catalysts

Certain embodiments of the invention relate to the production of biofuel from organic matter by treatment with an aqueous solvent under conditions of increased temperature and pressure in the presence of at least one "additional" catalyst. By "additional catalyst" it will be understood that the catalyst is supplementary (i.e. separate) to catalytic compounds intrinsically present in other reaction components such as the organic matter, aqueous solvent and/or walls of a reactor apparatus. In other words, an "additional" catalyst as contemplated herein may be considered to be an "extrinsic" catalyst in the sense that it is provided to the reaction as an individual reaction component.

For example, an embodiment of the invention in which lignite feedstock is treated with aqueous water (only) under conditions of increased temperature and pressure in a reactor apparatus would not be considered to utilise an "additional catalyst".

In contrast, an embodiment of the invention in which lignite feedstock is treated with aqueous water in the presence of a supplementary base catalyst (e.g. sodium hydroxide) under conditions of increased temperature and pressure in a reactor apparatus would be considered to utilise an "additional catalyst".

An additional catalyst as contemplated herein may be any catalyst that enhances the formation of biofuel from organic matter using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, and combinations thereof.

Methods of the invention may be performed using "additional" catalyst(s) in combination with "intrinsic" catalyst(s).

The optimal quantity of an additional catalyst used in the methods of the invention may depend on a variety of different factors including, for example, the type of organic matter under treatment, the volume of organic matter under treatment, the aqueous solvent utilised, the specific temperature and pressure employed during the reaction, the type of catalyst and the desired properties of the biofuel product. By following the methods of the invention, the optimal quantity of an additional catalyst to be used can be determined by one skilled in the art without inventive effort.

In certain embodiments, an additional catalyst or combination of additional catalysts may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the aqueous solvent).

In certain embodiments, an "additional" catalyst used in the reaction process may be an alkali and/or alkaline earth metal salt (e.g. potassium, calcium and/or sodium salts). For example, it has been demonstrated herein that alkali metal hydroxides and carbonates may be effective in reducing the oxygen content of the bio-oil product where all conditions except additional catalyst concentration are constant. In one embodiment, the optimum catalyst concentration (in the reaction itself) of an alkali metal hydroxide and/or alkali metal carbonate catalyst under a given set of otherwise substantially constant reaction conditions may be in the range of about 0.1 Molar to about 1 Molar. In preferred embodiments, the concentration may be about 0.1 Molar to about 0.3 Molar. Preferably, the concentration of alkali metal hydroxide and/or alkali metal carbonate catalyst used provides a product with a low oxygen content (e.g. less than about 11% w/w; between about 6% and about 11% w/w).

In general, the catalysts may be used to create or assist in forming and/or maintaining a reducing environment favouring the conversion of organic matter to biofuel. The reducing environment may favour hydrolysis of the organic matter, drive the replacement of oxygen with hydrogen, and/or stabilise the biofuel formed.

Treatment with a subcritical aqueous solvent (as opposed to supercritical aqueous solvent) may be advantageous in that less energy is required to perform the methods and the solvent may be better preserved during treatment. When a subcritical aqueous solvent is utilised it is contemplated that the additional use of one or more catalysts may be particularly beneficial in increasing the yield and/or quality of the biofuel. Further, the cost benefits of reduced input energy (i.e. to maintain subcritical rather than supercritical conditions) and preservation of the solvent may significantly outweigh the extra cost incurred by additionally including one or more of the catalysts described herein.

It is contemplated that under conditions of increased temperature and pressure water molecules in the aqueous solvent may dissociate into acidic (hydronium) and basic (hydroxide) ions facilitating hydrolysis of solid matter under treatment (i.e. solid to liquid transformation). In certain embodiments, the temperature and pressure at which the reaction is performed may be sufficiently high for desired levels of hydrolysis to occur without the use of additional catalysts. Additionally or alternatively, the specific organic material used may be relatively easy to hydrolyse (and additional catalysts therefore not required). For example, sufficient hydrolysis of fossilised organic matter such as lignite may be achieved using subcritical water without further addition of the catalysts described herein. However, the inclusion of such catalysts may be used as a means to increase the yield and/or quality of biofuel produced.

In other cases, the temperature and pressure at which the reaction is performed may not be sufficiently high for desired levels of hydrolysis to occur without the further addition of catalysts. Additionally or alternatively, the specific organic material used may be difficult to hydrolyse due to its specific chemical structure (e.g. lignocellulosic matter).

Accordingly, hydrolysis catalysts may be added to enhance (i.e. increase and/or accelerate) hydrolysis of solid matter under treatment (i.e. hydrolysis catalysts).

In certain embodiments, the hydrolysis catalysts may be base catalysts. Any suitable base catalyst may be used.

Non-limiting examples of suitable base catalysts for hydrolysis include alkali metal salts, transition metal salts, organic bases, and mixtures thereof.

The alkali metal salts or transition metal salts may comprise any inorganic anion(s), non-limiting examples of which include sulfate, sulfite, sulfide, disulfide, phosphate, aluminate, nitrate, nitrite, silicate, hydroxide, methoxide, ethoxide, alkoxide, carbonate and oxide. Preferred alkali metal or transition metal salts are sodium, potassium, iron, calcium and barium salts, and may comprise one or more anions selected from phosphate, aluminate, silicate, hydroxide, methoxide, ethoxide, carbonate, sulphate, sulphide, disulphide and oxide.

Non-limiting examples of suitable organic bases include ammonia, basic and polar amino-acids (e.g. lysine, histidine, arginine), benzathin, benzimidazole, betaine, cinchonidine, cinchonine, diethylamine, diisopropylethylamine, ethanolamine, ethylenediamine, imidazole, methyl amine, N-methylguanidine, N-methylmorpholine, N-methylpiperidine, phosphazene bases, picoline, piperazine, procain, pyridine, quinidine, quinoline, trialkylamine, tributylamine, triethyl amine, trimethylamine and mixtures thereof.

In certain embodiments, the hydrolysis catalysts may be acid catalysts although it will be recognised that acid catalysts may generally slower in catalysing hydrolysis of the organic matter than base catalysts. Any suitable acid catalyst may be used.

Non-limiting examples of suitable acid catalysts for hydrolysis include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments, the acid catalyst(s) for hydrolysis may be present in minerals of the organic matter and/or derived from the in situ formation of carboxylic acids and/or phenolics during the treatment process.

In certain embodiments of the invention, a mixture of one or more acid hydrolysis catalysts and one or more base hydrolysis catalysts may be used to enhance hydrolysis of solid matter under treatment.

The methods of the invention may employ catalysts for hydrolysis of the organic matter (as discussed in the preceding paragraphs). Additionally or alternatively, the methods may utilise catalysts that increase and/or accelerate the removal of oxygen (either directly or indirectly) from compounds in the organic matter under treatment. The removal of oxygen may provide a number of advantageous effects such as, for example, increasing the energy content and stability of the biofuel produced.

An acid catalyst may be used to enhance the removal of oxygen, for example, by dehydration (elimination) of water.

Accordingly, in certain embodiments an acid catalyst may be used to enhance hydrolysis, and to enhance the removal of oxygen from organic matter under treatment.

Any suitable acid catalyst may be used to enhance oxygen removal. Non-limiting examples of suitable acid catalysts for oxygen removal include liquid mineral acids, organic acids, and mixtures thereof. The liquid mineral acids and organic acids may comprise any inorganic anion(s), non-limiting examples of which include aluminate, sulfate, sulfite, sulfide, phosphate, phosphite, nitrate, nitrite, silicate, hydroxide and alkoxide (under supercritical or near supercritical conditions), carbonate and carboxy group anions.

Non-limiting examples of suitable organic acids include acetic acid, butyric acid, caproic acid, citric acid, formic acid, glycolic acid, 3-hydroxypropionic acid, lactic acid, oxalic acid propionic acid, succinic acid, uric acid, and mixtures thereof.

In certain embodiments alumino-silicates including hydrated forms (e.g. zeolites) may be used during the treatment of organic matter to assist in dehydration (elimination) of water.

Additionally or alternatively, the removal of oxygen may be enhanced by thermal means involving decarbonylation of, e.g. aldehydes (giving $R_3C$—H and CO gas) and decarboxylation of carboxylic acids in the material under treatment (giving $R_3C$—H and $CO_2$ gas). The speed of these reactions may be enhanced by the addition of acid and/or transition (noble) metal catalysts. Any suitable transition or noble metal may be used including those supported on solid acids. Non-limiting examples include $Pt/Al_2O_3/SiO_2$, $Pd/Al_2O_3/SiO_2$, $Ni/Al_2O_3/SiO_2$, and mixtures thereof.

Additionally or alternatively, a combined acid and hydrogenation catalyst may be used to enhance the removal of oxygen, for example, by hydrodeoxygenation (i.e. elimination of water (via acid component) and saturation of double bonds (via metal component)). Any suitable combined acid and hydrogenation catalyst may be used including those supported on solid acids. Non-limiting examples include $Pt/Al_2O_3/SiO_2$, $Pd/Al_2O_3/SiO_2$, $Ni/Al_2O_3/SiO_2$, $NiO/MoO_3$, $CoO/MoO_3$, $NiO/WO_2$, zeolites loaded with noble metals (e.g. ZSM-5, Beta, ITQ-2), and mixtures thereof.

The methods of the invention may employ catalysts that enhance hydrolysis of the organic matter under treatment, and/or catalysts that enhance the removal of oxygen from compounds in the organic matter (as discussed in the preceding paragraphs). Additionally or alternatively, the methods may utilise catalysts that enhance the concentration of hydrogen (either directly or indirectly) into compounds of the organic matter under treatment. The concentration of hydrogen may provide a number of advantageous effects such as, for example, increasing the energy content and stability of the biofuel produced.

A transfer hydrogenation catalyst may be used to enhance the concentration of hydrogen into compounds of the organic matter under treatment, for example, by transfer hydrogenation or in situ hydrogen generation.

Any suitable transfer hydrogenation catalyst may be used to the concentration of hydrogen. Non-limiting examples of suitable transfer hydrogenation catalysts include alkali metal hydroxides (e.g. sodium hydroxide), transition metal hydroxides, alkali metal formates (e.g. sodium formate), transition metal formats, reactive carboxylic acids, transition or noble metals, and mixtures thereof.

The alkali metal hydroxide or formate may comprise any suitable alkali metal. Preferred alkali metals include sodium, potassium, and mixtures thereof. The transition metal hydroxide or formate may comprise any suitable transition metal, preferred examples including Fe and Ru. The reactive carboxylic acid may be any suitable carboxylic acid, preferred examples including formic acid, acetic acid, and mixtures thereof. The transition or noble metal may be any suitable transition or noble metal, preferred examples including platinum, palladium, nickel, ruthenium, rhodium, and mixtures thereof.

Additionally or alternatively, a transition metal catalyst may be used to enhance the concentration of hydrogen into organic matter under treatment, for example, by hydrogenation with $H_2$. Non-limiting examples of suitable transition metal catalysts for hydrogenation with $H_2$ include zero valent metals (e.g. platinum, palladium, and nickel), transition metal sulfides (e.g. iron sulfide (FeS, $Fe_xS_y$), and mixtures thereof.

Additionally or alternatively, a water gas shift catalyst may be used to enhance the concentration of hydrogen into organic matter under treatment (i.e. via a water-gas shift reaction). Any suitable water gas shift (WGS) catalyst may be used including, for example, transition metals, transition metal oxides, and mixtures thereof (e.g. magnetite, platinum-based WGS catalysts, finely divided copper and nickel).

Additionally or alternatively, the concentration of hydrogen into organic matter under treatment may be facilitated by in situ gasification (i.e. thermal catalysis). The in situ gasification may be enhanced by the addition transition metals. Any suitable transition metal may be used including, for example, those supported on solid acids (e.g. $Pt/Al_2O_3/SiO_2$, $Pd/Al_2O_3/SiO_2$, $Ni/Al_2O_3/SiO_2$, and mixtures thereof), and transition metal sulfides (e.g. $Fe_xS_y$, $FeS/Al_2O_3$, $FeS/SiO_2$, $FeS/Al_2O_3/SiO_2$, and mixtures thereof). Table 1 (FIG. 8) provides a summary of various exemplary catalysts that may be employed in the methods of the invention and the corresponding reactions that they may catalyse.

Catalysts for use in the methods of the invention may be produced using chemical methods known in the art and/or purchased from commercial sources.

It will be understood that no particular limitation exists regarding the timing at which the additional catalyst(s) may be applied when performing the methods of the invention. For example, the catalyst(s) may be added to the organic matter, aqueous solvent, or a mixture of the same (e.g. a slurry) before heating/pressurisation to target reaction temperature and pressure, during heating/pressurisation to target reaction temperature and pressure, and/or after reaction temperature and pressure are reached. The timing of catalyst addition may depend on the reactivity of the feedstock utilised. For example, highly reactive feedstocks may benefit from catalyst addition close to or at the target reaction temperature and pressure, whereas less reactive feedstocks may have a broader process window for catalyst addition (i.e. the catalysts may be added prior to reaching target reaction temperature and pressure).

(ii) "Intrinsic" Catalysts

Certain embodiments of the invention relate to the production of biofuel from organic matter by treatment with an aqueous solvent under conditions of increased temperature and pressure in the presence of at least one "additional" catalyst. As noted above, an "additional" catalyst will be understood to indicate that the catalyst is supplied supplementary to catalysts intrinsically present in other reaction component(s).

Additionally or alternatively, production of biofuel from organic matter in accordance with the methods of the invention may be enhanced by the presence of "intrinsic"

catalyst(s) that are innately present in a given reaction component such as, for example, any one or more of organic matter feedstock, aqueous solvent, and/or vessel walls of a reactor apparatus in which the organic matter may be treated.

Accordingly, the methods of the invention may be performed using "additional" catalyst(s) in combination with "intrinsic" catalyst(s), or, "intrinsic" catalyst(s) alone.

The optimal quantity of an intrinsic catalyst used in the methods of the invention may depend on a variety of different factors including, for example, the type of organic matter under treatment, the volume of organic matter under treatment, the aqueous solvent utilised, the specific temperature and pressure employed during the reaction, the type of catalyst and the desired properties of the biofuel product.

In certain embodiments, an intrinsic catalyst or combination of intrinsic and additional catalyst may be used in an amount of between about 0.1% and about 10% w/v catalysts, between about 0.1% and about 7.5% w/v catalysts, between about 0.1% and about 5% w/v catalysts, between about 0.1% and about 2.5% w/v catalysts, between about 0.1% and about 1% w/v catalysts, or between about 0.1% and about 0.5% w/v catalysts (in relation to the aqueous solvent).

In certain embodiments, an "intrinsic" catalyst used in the reaction process may be an alkali and/or alkaline earth metal salt (e.g. potassium, calcium and/or sodium salts). For example, alkali metal hydroxides and carbonates may be effective in reducing the oxygen content of the bio-oil product. In one embodiment, the optimum catalyst concentration (in the reaction itself) of an alkali metal hydroxide and/or alkali metal carbonate catalyst under a given set of otherwise substantially constant reaction conditions may be in the range of about 0.1 Molar to about 1 Molar. In preferred embodiments, the concentration may be about 0.1 Molar to about 0.3 Molar. Preferably, the concentration of alkali metal hydroxide and/or alkali metal carbonate catalyst used provides a product with a low oxygen content (e.g. less than about 11% w/w; between about 6% and about 11% (w/w).

One or more different types of catalysts may be present in organic matter used as feedstock to the reaction. Non-limiting examples of these catalysts include minerals and/or alkali and/or alkaline earth metal salts. In certain embodiments, potassium and/or calcium salt present in organic matter feedstock may provide catalytic activity in the reaction.

For example, lignocellulosic biomass may comprise a variable amounts of ash (e.g. between 0.1% to about 50% ash), and the ash in turn may comprise various amounts of alkali salts (e.g. potassium salts and/or calcium salts) (see, for example, Stanislav et al., "*An Overview of the Chemical Composition of Biomass*", Fuel 89 (2010), 913-933). For example, the ash may comprise between about 0.2% to about 64% potassium (as potassium oxide) and/or between about 1% to about 83% calcium (as calcium oxide). Alkali salts present in the feedstock such as, for example, potassium and calcium salts may be catalysts for a range of reactions under the reaction conditions of the present invention including those reactions described in Table 1 (FIG. 8).

Additionally or alternatively, an aqueous solvent used in the methods of the invention may provide intrinsic catalysts to the reaction. Non-limiting examples of these catalysts include hydronium and/or hydroxide ions of water.

Additionally or alternatively, "intrinsic" catalysts may be provided by the vessel walls of a reactor apparatus in which the organic matter may be treated. Non-limiting examples of materials commonly used for reactor construction (i.e. including reactor vessel walls) are alloys of iron with other metals including chromium, nickel, manganese, vanadium, molybdenum, titanium and silicon. Non-limiting examples of suitable steel grades are 310, 316, and alloy 625.

In certain embodiments, "intrinsic" catalysts that may be provided by the vessel walls of a reactor apparatus are transition/noble metals.

Non-limiting examples of "intrinsic" catalysts may be provided by the vessel walls of a reactor apparatus include iron metal, hydroxides of iron, oxides of iron, carbonates of iron, hydrogen carbonates of iron, acetates of iron; nickel metal, hydroxides of nickel, oxides of nickel, carbonates of nickel, hydrogen carbonates of nickel; chromium metal, hydroxides of chromium, oxides of chromium, carbonates of chromium, hydrogen carbonates of chromium; manganese metal, hydroxides of manganese metal, oxides of manganese metal, carbonates of manganese metal, and/or hydrogen carbonates of manganese metal. Hydroxides may be present by virtue of reaction of the metals with water and alkaline "additional" catalysts. Oxides may be present by virtue of reaction of metals with oxygen-containing compounds and as passivating layers. Carbonates and hydrogen carbonates may be present by virtue of reactions of metals, metal oxides and/or metal hydroxides with carbon dioxide generated in-situ by decarboxylation reactions. Acetates of metals may be present by virtue of reactions of metals, metal oxides, metal hydroxides, metal hydrogen carbonates and metal carbonates with acetic acid generated in-situ by hydrolysis of organic matter.

Metals and metal compounds associated with surfaces made of steel and similar materials may catalyse various reactions including, but not limited to, one or more of the reactions described in Table 1 (FIG. 8). For example, the catalysts may catalyse hydrothermal reactions such as, for example, decarboxylation reactions (see, for example, Maiella and Brill, "*Spectroscopy of Hydrothermal Reactions. 10. Evidence of Wall Effects in Decarboxylation Kinetics of* 1.00 *m* $HCO_2X$ (X=H, Na) *at* 280-330° *C. and* 275 *bar*", J. Phys. Chem. A (1998), 102, 5886-5891) and hydrogen transfer reactions (see, for example, Onwudili and Williams, "Hydrothermal reactions of sodium formate and sodium acetate as model intermediate products of the sodium hydroxide-promoted hydrothermal gasification of biomass", Green Chem., (2010), 12, 2214-2224).

(iii) Recycling of Catalysts

Catalysts according to the invention may be recycled for use in subsequent reactions for conversion of organic matter feedstock into biofuel. The recycled catalysts may be "additional" catalysts and/or "intrinsic" catalysts as described herein.

By way of non-limiting example only, intrinsic catalysts (e.g. alkali salts such as potassium and calcium salts) may be transferred to the aqueous liquid phase during the reaction. Because significant concentrations of such catalysts (e.g. alkali salts of potassium and calcium) may be present in organic matter feedstocks processed according to methods of the invention, in certain embodiments aqueous phases containing dissolved catalysts (e.g. potassium and/or calcium salts) may be recycled.

Accordingly, in certain embodiments intrinsic catalysts from various reaction component(s) (e.g. from any one or more of the organic matter feedstock, the aqueous solvent, and/or vessel walls of a reactor apparatus) may be renewed in situ alleviating or reducing the need to provide "additional" catalysts in subsequent rounds of feedstock conversion. This may be particularly advantageous in embodiments of the invention relating to extended operation at scales at or larger than pilot plant scale. In general, it is contemplated that the recycling of intrinsic catalysts present in reaction components such as organic matter feedstock (e.g. alkali salts) may allow for a situation where "additional" catalysts are required during start-up operation only.

In preferred embodiments, an "intrinsic" catalyst recycled in the reaction process is an alkali and/or alkaline earth metal salt (e.g. potassium, calcium and/or sodium salts).

Exemplary Reaction Conditions

In certain embodiments, organic matter treated using the methods of the invention is (or comprises) a fossilised organic matter (see section above entitled "Organic matter"). For example, the organic matter treated may be lignite.

Conversion of the fossilised organic matter into biofuel may be conducted, for example, using an aqueous solvent at temperature(s) of between about 200° C. and about 400° C. and pressure(s) of between about 150 bar and about 350 bar; preferably at temperature(s) of between about 250° C. and about 375° C. and pressure(s) of between about 175 bar and about 300 bar; more preferably at temperature(s) of between about 300° C. and about 375° C. and pressure(s) of between about 200 bar and about 250 bar; more preferably at temperature(s) of between about 320° C. and about 360° C. and pressure(s) of between about 200 bar and about 250 bar; still more preferably at temperature(s) of between about 340° C. and about 360° C. and pressure(s) of between about 200 bar and about 240 bar.

Preferably, the aqueous solvent is water, or an aqueous alcohol (e.g. aqueous ethanol or methanol) comprising between about 1% and about 5% w/v alcohol, an aqueous alcohol (e.g. aqueous ethanol or methanol) comprising between about 1% and about 10% w/v alcohol, between about 5% and about 15% w/v alcohol, or between about 5% and about 20% w/v alcohol.

Preferably, the retention time is between about 15 minutes and about 45 minutes, more preferably between about 15 minutes and about 40 minutes, and still more preferably between about 20 minutes and about 30 minutes.

Conversion of the fossilised organic matter into biofuel may be enhanced by the addition of one or more catalysts (see subsection above entitled "Catalysts"). For example, the conversion may be enhanced by the addition of a transfer hydrogenation catalyst (e.g. formic acid, sodium formate, and/or sodium hydroxide (under a reducing atmosphere)) or a direct hydrogenation catalyst (e.g. Ni, Pt, Pd on silica or carbon (under a reducing atmosphere)).

Accordingly, in some embodiments a biofuel may be produced from organic matter comprising fossilised organic matter (e.g. lignite) using water as a solvent at temperature(s) of between 300° C. and 375° C. and pressure(s) of between about 200 bar and about 250 bar, and a retention time of more than about 15 minutes. Optionally, the conversion may be enhanced by the addition of one or more catalysts as described herein. The catalyst may comprise one or more transfer hydrogenation catalysts (e.g. sodium formate, sodium hydroxide (under a reducing atmosphere), formic acid and/or formate).

In certain embodiments, the reaction comprises an alkali metal hydroxide and/or alkali metal carbonate catalyst (e.g. sodium hydroxide, and/or sodium carbonate) in the range of about 0.1 Molar to about 1 Molar (in the reaction). In preferred embodiments, the concentration may be about 0.1 Molar to about 0.3 Molar. In certain embodiments, organic matter treated using the methods of the invention is (or comprises) lignocellulosic matter (see section above entitled "Organic matter"). For example, the organic matter treated may be radiata pine.

Conversion of the lignocellulosic matter into biofuel may be conducted, for example, using an aqueous solvent at temperature(s) of between about 200° C. and about 400° C. and pressure(s) of between about 150 bar and about 350 bar; preferably at temperature(s) of between about 250° C. and about 375° C. and pressure(s) of between about 150 bar and about 250 bar; more preferably at temperature(s) of between about 270° C. and about 360° C. and pressure(s) of between about 170 bar and about 250 bar; and more preferably at temperature(s) of between about 300° C. and about 340° C. and pressure(s) of between about 200 bar and about 240 bar.

Preferably, the aqueous solvent is selected from an aqueous alcohol (e.g. aqueous ethanol or aqueous methanol) comprising between about 1% and about 50% w/v alcohol, between about 1% and about 40% w/v alcohol, between about 5% and about 50% w/v alcohol, between about 5% and about 35% w/v alcohol, between about 5% and about 30% w/v alcohol, between about 10% and about 30% w/v alcohol, between about 15% and about 25% w/v alcohol, or between about 18% and about 22% w/v alcohol.

Conversion of the lignocellulosic matter into biofuel may be enhanced by the addition of one or more catalysts (see subsection above entitled "Catalysts"). For example, the conversion may be enhanced by the addition of a transfer hydrogenation catalyst (e.g. formic acid, sodium formate and/or sodium hydroxide).

In certain embodiments, the reaction comprises an alkali metal hydroxide and/or alkali metal carbonate catalyst (e.g. sodium hydroxide, and/or sodium carbonate) in the range of about 0.1 Molar to about 1 Molar (in the reaction). In preferred embodiments, the concentration may be about 0.1 Molar to about 0.3 Molar.

Accordingly, in some embodiments a biofuel may be produced from organic matter comprising lignocellulosic matter using between about 5% and about 50% w/v of aqueous alcohol (e.g. aqueous ethanol of methanol) at temperature(s) of between 250° C. and 400° C. and pressure(s) of between about of between about 150 bar and about 250 bar, and a retention time of more than about 15 minutes. Optionally, the conversion may be enhanced by the addition of one or more catalysts as described herein. The catalyst may comprise one or more transfer hydrogenation catalysts (e.g. formic acid, formate and/or sodium hydroxide).

Continuous Flow

Biofuel production from organic matter using the methods of the invention may be assisted by performing the methods under conditions of continuous flow.

Although the methods of the invention need not be performed under conditions of continuous flow, doing so may provide a number of advantageous effects. For example, continuous flow may facilitate the accelerated implementation and/or removal of heat and/or pressure applied to the slurry. This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. polymerisation) as the slurry heats/pressurises and/or cools/de-pressurises. Continuous flow is also believed to enhance reactions responsible for conversion of organic matter to biofuel by virtue of generating mixing and shear forces believed to aid in emulsification which may be an important mechanism involved in the transport and "storage" of the oils generated away from the reactive surfaces of the feedstock.

Accordingly, in preferred embodiments the methods of the invention are performed under conditions of continuous flow. As used herein, the term "continuous flow" refers to a process wherein organic matter mixed with aqueous solvent in the form of a slurry (with or without additional catalysts) is subjected to:
  (d) heating and pressurisation to a target temperature and pressure,
  (e) treatment at target temperature(s) and pressure(s) for a defined time period (i.e. the "retention time"), and
  (f) cooling and de-pressurisation,
while the slurry is maintained in a stream of continuous movement along the length (or partial length) of a given surface. It will be understood that "continuous flow" conditions as contemplated herein are defined by a starting point of heating and pressurisation (i.e. (a) above) and by an end point of cooling and de-pressurisation (i.e. (c) above).

Continuous flow conditions as contemplated herein imply no particular limitation regarding flow velocity of the slurry provided that it is maintained in a stream of continuous movement.

Preferably, the minimum (volume-independent) flow velocity of the slurry along a given surface exceeds the settling velocity of solid matter within the slurry (i.e. the terminal velocity at which a suspended particle having a density greater than the surrounding aqueous solution moves (by gravity) towards the bottom of the stream of slurry).

For example, the minimum flow velocity of the slurry may be above about 0.01 cm/s, above about 0.05 cm/s, preferably above about 0.5 cm/s and more preferably above about 1.5 cm/s. The upper flow velocity may be influenced by factors such as the volumetric flow rate and/or retention time. This in turn may be influenced by the components of a particular reactor apparatus utilised to maintain conditions of continuous flow.

Continuous flow conditions may be facilitated, for example, by performing the methods of the invention in a suitable reactor apparatus. A suitable reactor apparatus will generally comprise heating/cooling, pressurising/de-pressuring and reaction components in which a continuous stream of slurry is maintained.

The use of a suitable flow velocity (under conditions of continuous flow) may be advantageous in preventing scale-formation along the length of a particular surface that the slurry moves along (e.g. vessel walls of a reactor apparatus) and/or generating an effective mixing regime for efficient heat transfer into and within the slurry.

Biofuel Products

The methods of the invention may be used to produce biofuel from organic matter. The nature of the biofuel product may depend on a variety of different factors including, for example, the organic material feedstock, and/or the reaction conditions/reagents utilised in the methods.

In certain embodiments, the biofuel product may comprise one or more of bio-oil, oil char (e.g. carbon char with bound oils), soluble light oil, gaseous product (e.g. methane, hydrogen, carbon monoxide and/or carbon dioxide), alcohol (e.g. ethanol, methanol and the like), and biodiesel.

In certain embodiments, a biofuel may be produced from fossilised organic matter such as, for example, lignite (brown coal), peat or oil shale. The biofuel may comprise solid, liquid and gas phases. The solid phase may comprise a high carbon char (upgraded PCI equivalent coal). The liquid phase may comprise bio-oils. The gaseous product may comprise methane, hydrogen, carbon monoxide and/or carbon dioxide.

In other embodiments, a biofuel may be produced from organic matter comprising lignocellulosic matter. The biofuel may comprise a liquid phase comprising bio-oil.

Biofuels produced in accordance with the methods of the invention may comprise a number of advantageous features, non limiting examples of which include reduced oxygen content, increased hydrogen content, increased energy content and increased stability.

A bio-oil product (also referred to herein as an "oil" product) produced in accordance with the methods of the invention may comprise an energy content of greater than about 25 MJ/kg, preferably greater than about 30 MJ/kg, more preferably greater than about 32 MJ/kg, still more preferably greater than about 35 MJ/kg, and even more preferably greater than about 37 MJ/kg, 38 MJ/kg or 39 MJ/kg. The bio-oil product may comprise less than about 15% wt db oxygen, preferably less than about 10% wt db oxygen, more preferably less than about 8% wt db oxygen and still more preferably less than about 7% wt db oxygen. The bio-oil product may comprise greater than about 6% wt db hydrogen, preferably greater than about 7% wt db hydrogen, more preferably greater than about 8% wt db hydrogen, and still more preferably greater than about 9% wt db hydrogen. The molar hydrogen:carbon ratio of a bio-oil of the invention may be less than about 1.5, less than about 1.4, less than about 1.3, or less than about 1.2.

A bio-oil produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, plant sterols, modified plant sterols, asphaltenes, pre-asphaltenes, and waxes.

A char or oil char product produced in accordance with the methods of the invention may comprise an energy content of greater than about 20 MJ/kg, preferably greater than about 25 MJ/kg, more preferably greater than about 30 MJ/kg, and still more preferably greater than about 31 MJ/kg, or 32 MJ/kg. The char or oil char product may comprise less than about 20% wt db oxygen, preferably less than about 15% wt db oxygen, more preferably less than about 10% wt db oxygen and still more preferably less than about 9% wt db oxygen. The char or oil char product may comprise greater than about 2% wt db hydrogen, preferably greater than about 3% wt db hydrogen, more preferably greater than about 4% wt db hydrogen, and still more preferably greater than about 5% wt db hydrogen. The molar hydrogen:carbon ratio of a char or oil char product of the invention may be less than about 1.0, less than about 0.9, less than about 0.8, less than about 0.7, or less than about 0.6.

An oil char product produced in accordance with the methods of the invention may comprise, for example, any one or more of the following classes of compounds: phenols, aromatic and aliphatic acids, ketones, aldehydes, hydrocarbons, alcohols, esters, ethers, furans, furfurals, terpenes, polycyclics, oligo- and polymers of each of the aforementioned classes, asphaltenes, pre-asphaltenes, and waxes.

A char product (upgraded PCI equivalent coal) produced in accordance with the methods of the invention may comprise, for example, a mixture of amorphous and graphitic carbon with end groups partially oxygenated, giving rise to surface carboxy- and alkoxy groups as well as carbonyl and esters.

Biofuels produced in accordance with the methods of the invention may be cleaned and/or separated into individual components using standard techniques known in the art.

For example, solid and liquid phases of biofuel product (e.g. from the conversion of coal) may be filtered through a pressure filter press, or rotary vacuum drum filter in a first stage of solid and liquid separation. The solid product obtained may include a high carbon char with bound oils. In certain embodiments, the oil may be separated from the char, for example, by thermal distillation or by solvent extraction. The liquid product obtained may contain a low percentage of light oils, which may be concentrated and recovered though an evaporator.

A bio-oil product (e.g. from the conversion of lignocellulosic matter) may be recovered by decanting or by density separation. Water soluble light oils may be concentrated and recovered through an evaporator. Bio-oils produced in accordance with the methods of the invention may be polished or distilled to remove any remaining water or in preparation for further processing.

Biofuel produced in accordance with the methods of the invention may be used in any number of applications. For example, the biofuels may be blended with other fuels, including for example, ethanol, diesel and the like. Additionally or alternatively, the biofuels may be upgraded into higher fuel products. Additionally or alternatively, the biofuels may be used directly, for example, as petroleum products and the like.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

EXAMPLES

The invention will now be described with reference to specific examples, which should not be construed as in any way limiting.

Example 1: Conversion of Organic Matter to Biofuel (i) Apparatus

The apparatus consisted in part of a continuous flow elongated reactor assembly with high surface area, constructed of 310 stainless steel. Because of the high degree of interaction of the reacting materials with the reactor wall under continuous flow conditions, i.e. turbulent with small radius (21.4 mm inches maximum and 4.25 mm minimum) and significant length (total 84 meters), the following "intrinsic" catalysts were present in each of the different reactions described (i.e. regardless of whether "additional" catalysts were included): iron metal, hydroxides of iron, oxides of iron, carbonates of iron, hydrogen carbonates of iron, acetates of iron; nickel metal, hydroxides of nickel, oxides of nickel, carbonates of nickel, hydrogen carbonates of nickel; chromium metal, hydroxides of chromium, oxides of chromium, carbonates of chromium, hydrogen carbonates of chromium; manganese metal, hydroxides of manganese metal, oxides of manganese metal, carbonates of manganese metal, hydrogen carbonates of manganese metal. Hydroxides were present by virtue of reaction of the metals with water and alkaline additional catalysts. Oxides were present by virtue of reaction of metals with oxygen-containing compounds and as passivating layers. Carbonates and hydrogen carbonates were present by virtue of reactions of metals, metal oxides and metal hydroxides with carbon dioxide generated in-situ by decarboxylation reactions. Acetates of metals were present by virtue of reactions of metals, metal oxides, metal hydroxides, metal hydrogen carbonates and metal carbonates with acetic acid generated in-situ by hydrolysis of organic matter.

(ii) Slurry Preparation

Feedstock was ground to a micron level suitable for pumping. The grinding process was wet or dry depending on the nature of the feedstock (i.e. lignite or lignocellulosic biomass). The ground feedstock was passed through a screening system to remove any remaining oversize particles or foreign objects. The feedstock was then slurried with water in feed tanks and held ready for processing. In certain cases ethanol (20% wt) was added to the slurry (lignocellulosic biomass feedstock sample numbers 1-4: see Table 2B).

Stages (ii)-(iv) below were conducted under continuous flow conditions.

(iii) Heating and Pressurisation

The feedstock slurry was drawn from the feed tanks and brought to the target reaction pressure (see Tables 2A and 2B) using a two stage pumping system. The first stage utilised a low pressure pump to supply the slurry to a second stage high pressure pump. The high pressure pump was used to bring the slurry to the required reaction pressure (sub-second interval). The slurry was then passed though a five stage concentric pipe heating system. Each heating stage has individual control to adjust the process temperatures and heating rates. The slurry was brought to the reaction temperature over a period of 1-2 minutes (approximately 6-7° C./second), catalyst(s) then added where applicable (lignite feedstock sample numbers 4, 6, 7, 8, 9, and 10—see Table 2A; lignocellulosic feedstock sample numbers 2, 3, and 4—see Table 2B), and the mixture propelled into the reactor.

A summary of the feedstocks used and the parameters they were treated under is provided in Tables 2A and 2B below. The radiata pine lignin/cellulose fractions (feedstock sample numbers 1 and 2 of Table 2B) where generated by extracting hemicellulose from lignocellulosic starting material (Radiata pine) using methods described in PCT publication number WO/2010/034055, the entire contents of which are incorporated herein by reference.

TABLE 2A lignite feedstock and run conditions

| Feedstock Sample Number | Feedstock Type | Solids in slurry (% wt) | Temp (° C.) | Pressure (bar) | Retention (min) | Additives |
|---|---|---|---|---|---|---|
| 1. | Lignite | 22.00 | 350 | 240 | 20 | None |
| 2. | Lignite | 11.50 | 350 | 240 | 20 | None |
| 3. | Lignite | 8.00 | 250 | 220 | 25 | None |
| 4. | Lignite | 9.10 | 350 | 220 | 25 | 1.3% wt HCOONa |
| 5. | Lignite | 11.50 | 350 | 240 | 25 | None |
| 6. | Lignite | 12.73 | 350 | 240 | 25 | 0.2M NaOH |
| 7. | Lignite | 12.00 | 350 | 220 | 25 | 1.5% wt HCOONa |
| 8. | Lignite/lignocellulosic biomass (Banna Grass) | 11.00 | 350 | 220 | 25 | 4 g/L NaOH; 10% Banna Grass |
| 9. | Lignite | 10 | 340 | 230 | 25 | 0.35 L/h NaOH, CO, 23.8 g/min |
| 10. | Lignite | 16.00 | 330 | 240 | 5 | 0.1M NaOH |
| 11. | Lignite | 5 | 260 | 240 | 20 | None |
| 12 | Lignite | 15.0 | 350 | 240 | 25 | None |
| 13 | Lignite | 20.0 | 340 | 240 | 25 | None |
| 14 | Lignite | 22.0 | 350 | 240 | 25 | 1% wt solid iron oxide, 0.03M NaOH |
| 15 | Lignite and sucrose | 16.0 | 350 | 240 | 25 | 1% $Fe_2O_3$/0.33M NaOH/10% Sucrose |
| 16 | Lignite and lignocellulosic biomass | 26.5 | 340 | 240 | 25 | 0.5% iron oxide, 6% Bannagrass, 20% lignite |
| 17 | Lignite | 25.0 | 350 | 240 | 25 | None |
| 18 | Lignite | 25.0 | 350 | 240 | 25 | 0.07M NaOH |
| 19 | Lignite | 25.0 | 350 | 240 | 25 | 0.03M NaOH |
| 20 | Lignite | 25.0 | 350 | 240 | 13 | None |
| 21 | Lignite | 25.0 | 350 | 240 | 13 | 0.015M NaOH |
| 22 | Lignite | 25.0 | 280 | 240 | 13 | None |
| 23 | Lignite | 22.0 | 350 | 240 | 25 | 2% wt Iron Pyrites |

TABLE 2B lignocellulosic biomass feedstock and run conditions

| Feedstock Sample Number | Feedstock Type | Solids in slurry (% wt) | Temp (° C.) | Pressure (bar) | Residence (min) | Additives |
|---|---|---|---|---|---|---|
| 1. | Lignin/Cellulose fraction (Radiata Pine) hemi extracted | 8.00 | 330 | 180 | 10 | 20% wt Ethanol |
| 2. | Lignin/Cellulose fraction (Radiata Pine) hemi extracted | 8.00 | 320 | 180 | 30 | 20% wt Ethanol; 1M sodium hydroxide |
| 3. | Lignocellulosic matter (Banna Grass)/Lignite | 12.00 | 350 | 220 | 25 | 20% wt Ethanol, 4 g/L sodium hydroxide; 10 wt % banna grass (dry basis) |
| 4. | Lignocellulosic matter (Radiata Pine) | 10.00 | 320 | 190 | 30 | 20% wt Ethanol; 0.2M sodium hydroxide |
| 5 | Angiosperm (duckweed) | 10.00 | 320 | 200 | 3.0 | 20% wt ethanol |
| 6 | Lignocellulosic matter (Radiata Pine) | 10.00 | 320 | 240 | 25.0 | 20% ethanol, 0.07M sodium hydroxide |
| 7 | Lignocellulosic matter (Radiata Pine) | 10.00 | 320 | 240 | 25.0 | 20% ethanol, 0.13M sodium hydroxide |
| 8 | Lignocellulosic matter (Radiata Pine) | 10.00 | 350 | 240 | 25.0 | 20% ethanol, 0.13M sodium hydroxide |
| 9 | Lignocellulosic matter (Radiata Pine) | 10.00 | 350 | 240 | 25.0 | 16.6% Methanol, 0.13M sodium hydroxide |
| 10 | Lignocellulosic matter (Radiata Pine) | 10.00 | 350 | 240 | 25.0 | 20% ethanol, 0.13M sodium hydroxide |

TABLE 2B-continued lignocellulosic biomass feedstock and run conditions

| Feedstock Sample Number | Feedstock Type | Solids in slurry (% wt) | Temp (° C.) | Pressure (bar) | Residence (min) | Additives |
|---|---|---|---|---|---|---|
| 11 | Lignocellulosic matter (Radiata Pine) | 10.00 | 350 | 240 | 25.0 | 20% ethanol, 0.13M sodium hydroxide |
| 12 | Lignocellulosic matter (Radiata Pine) | 10.00 | 350 | 240 | 12.5 | 20% ethanol |
| 13 | Lignocellulosic matter (Radiata Pine) | 10.00 | 350 | 240 | 12.5 | None |
| 14 | Lignocellulosic matter (Radiata Pine) | 10.00 | 350 | 240 | 12.5 | 0.03M NaOH |
| 15 | Lignocellulosic matter (Radiata Pine) | 10.00 | 350 | 240 | 12.5 | 20% ethanol, 0.03M sodium hydroxide |
| 16 | Lignocellulosic matter (Radiata Pine) | 10.00 | 350 | 240 | 12.5 | 20% ethanol, 0.02M sodium carbonate |
| 17 | Lignocellulosic matter (Radiata Pine) | 10.00 | 350 | 240 | 25.0 | None |
| 18 | Lignocellulosic matter (Radiata Pine) | 10.00 | 350 | 240 | 25.0 | None |
| 19 | Lignocellulosic matter (Radiata Pine) | 10.00 | 350 | 240 | 25.0 | 0.13M NaOH |
| 20 | Lignocellulosic matter (Radiata Pine) | 10.00 | 350 | 240 | 25.0 | 0.13M NaOH |

(iv) Conversion Reaction

The reactor utilised is designed to keep the slurry in a laminar flow regime for a specific residence time (i.e. "retention time"). The reactor is comprised of a series of multiple tubular reaction vessels which may be coupled or decoupled to adjust the total residence time. The residence time utilised depended on the time that was required for sufficient conversion of the feedstock to take place, and in some cases varied depending upon the nature of the feedstock, the nature of the aqueous solvent utilised, and/or the presence/absence of additional catalysts in the slurry (see Tables 2A and 2B). The reactor utilised has external trace heating so that accurate control of the temperature profile may be achieved.

(v) Cooling and Pressure Let-Down

Once sufficiently reacted the slurry exited the reactor and was passed through a concentric pipe cooling module. The cooling module was used as a heat exchanger to reduce the process temperature to suitable levels for the pressure let down system, and to offer an opportunity for heat recovery to improve overall thermal efficiency.

The slurry was cooled to approximately 180° C. over a period of about 5 to 30 seconds (preferably 25 seconds), the rate of cooling having been optimised to minimise solid formation and precipitation. The slurry was passed through a pressure let down system which reduced the pressure to atmospheric levels and directed the product into a collection tank. The pressure let down system is comprised of a combination of selectable, fixed orifice, parallel paths, and also a variable orifice control valve. The collection tank uses a water jacket to cool the slurry back to ambient temperature. Accordingly, the pressure let down system and water jacket of the collection tank facilitated an almost instantaneous depressurisation to ambient pressure and a rapid decrease in temperature from approximately 180° C. to ambient temperature.

(vi) Biofuel Processing

The biofuel product was then processed for separation and refining. For lignite feedstock, the biofuel product was filtered through a pressure filter press, or rotary vacuum drum filter to facilitate the first stage of solid and liquid separation. The solid product includes a high carbon char with bound oils. The oil was separated from the char either by thermal distillation or by solvent extraction. The liquid product contains a low percentage of light oils, which were concentrated and recovered though an evaporator.

For lignocellulosic biomass feedstock (or cellulose/lignin fraction feedstock), the product can be all oil (i.e. no solid present), depending on processing conditions and the nature of the feedstock (ash-content, etc.). The majority was recovered by decanting or by density separation. There was also a small percentage of water soluble light oils which were concentrated and recovered through an evaporator. Product oils may be further polished or distilled to remove any remaining water or in preparation for further processing.

Example 2: Biofuel Product Analysis

Biofuel product analysis was performed using standard techniques as per the brief descriptions below:

Coal/Char Analysis:

Proximate analysis including percentage of moisture, ash yield, volatile matter and fixed carbon was conducted in accordance with Australian Standard Methods AS2434.1, 2 & 8.

Ultimate analysis including Carbon, Hydrogen and Nitrogen and Total Sulphur was conducted in accordance with Australian Standard Methods AS1038.6.4 and AS1038.6.3.2.

Calorific value was conducted in accordance with Australian Standard Method AS1038.5.

Analysis of ash was conducted in accordance with Australian Standard Method AS1038.14

Determination of ash fusion temperatures under an oxidising atmosphere was conducted in accordance with Australian Standard Method AS1038.15

Oil Analysis:

Ultimate analysis including Carbon, Hydrogen and Nitrogen was conducted in accordance with Australian Standard Method AS1038.6.4.

Total sulphur analysis was conducted in accordance with United States Environmental Protection Agency (USEPA) 5050 followed by inductively coupled plasma atomic emission spectroscopy (ICPAES).

Calorific value was conducted in accordance with Australian Standard Method AS1038.5.

Determination of total moisture in oils was conducted in accordance with Active Standard ATSM D6304.

Table 3 below provides details regarding the properties of raw feedstock materials utilised in the biofuel generation process. Tables 4a, 4b and 5 (FIGS. 9, 10, and 11) provide details regarding the properties of biofuels produced in accordance with the process.

TABLE 6 percentage of mass recovery at different temperatures
Report Number/COQ Numbers 322196

| Method | Properties | Units | |
|---|---|---|---|
| D7169 | Initial Boiling Point | ° C. | 123.0 |
| | 1% Mass Recovered @ | ° C. | 157.5 |
| | 5% Mass Recovered @ | ° C. | 218.5 |
| | 10% Mass Recovered @ | ° C. | 252.5 |
| | 20% Mass Recovered @ | ° C. | 294.0 |
| | 30% Mass Recovered @ | ° C. | 332.5 |
| | 40% Mass Recovered @ | ° C. | 387.0 |
| | 50% Mass Recovered @ | ° C. | 428.0 |
| | 60% Mass Recovered @ | ° C. | 459.5 |
| | 70% Mass Recovered @ | ° C. | 484.5 |
| | 80% Mass Recovered @ | ° C. | 508.0 |
| | 90% Mass Recovered @ | ° C. | 537.5 |
| | 95% Mass Recovered @ | ° C. | 560.5 |
| | 99% Mass Recovered @ | ° C. | 620.5 |
| | Final Boiling Point | ° C. | 676.5 |
| | % Rec @ 360° C. | % mass | 35.2 |
| D7169 | % Rec @ 370° C. | % mass | 37.0 |
| | % Rec @ 555° C. | % mass | 94.0 |

TABLE 3 analysis of feedstock characteristics

| Feedstock | GCV (MJ/kg db) | Carbon (% wt db) | Hydrogen (% wt db) | Nitrogen (% wt db) | Sulphur (% wt db) | Ash (% wt db) | Oxygen (% wt db) | Molar H/C Ratio |
|---|---|---|---|---|---|---|---|---|
| Lignite feedstock sample nos. | | | | | | | | |
| 1 & 2 | 25.6 | 66.3 | 4.4 | 0.6 | 0.2 | 3.1 | 25.4 | 0.8 |
| 3 & 4 | 25.4 | 67.1 | 4.2 | 0.7 | 0.2 | 2.4 | 25.4 | 0.7 |
| 11, | 24.1 | 62.2 | 5.4 | 0.6 | 3.8 | 12.9 | 15.1 | 1.0 |
| 5, 6, 7 & 8 | 25.5 | 65.5 | 4.6 | 0.7 | 0.3 | 2.2 | 26.8 | 0.8 |
| 9 & 10 | 24.7 | 63.4 | 4.4 | 0.5 | 0.3 | 3.6 | 27.8 | 0.8 |
| Lignocellulosic matter feedstock sample nos. | | | | | | | | |
| 1, 2, 3 & 4 | 17.8 | 48.0 | 5.6 | 0.1 | 0.0 | 0.5 | 45.7 | 1.4 |

| Feedstock | GCV (MJ/kg db) | Carbon (% wt db) | Hydrogen (% wt db) | Nitrogen (% wt db) | Sulphur (% wt db) | Oxygen (% wt db) | Molar H/C Ratio |
|---|---|---|---|---|---|---|---|
| Lignite feedstock sample numbers | | | | | | | |
| 12 | 25.64 | 66.30 | 4.35 | 0.63 | 0.23 | 25.39 | 0.78 |
| 13 to 17 &23 | 24.70 | 63.40 | 4.40 | 0.48 | 0.33 | 27.79 | 0.83 |
| 18 to 22 | 26.00 | 64.30 | 4.90 | 0.79 | 0.70 | 23.31 | 0.91 |
| Lignocellulosic feedstock sample numbers | | | | | | | |
| 5 | 19.40 | 46.40 | 6.20 | 3.48 | 0.30 | 37.52 | 1.59 |
| 6 to 20 | 17.81 | 48.00 | 5.61 | 0.13 | 0.02 | 45.74 | 1.39 |

Effect of Alkali Metal Hydroxides and Carbonates on Oxygen Content:

FIG. 1 demonstrates the effectiveness of alkali metal hydroxides and carbonates in reducing the oxygen content of the bio-oil product where all conditions except additional catalyst concentration are constant. The optimum catalyst concentration of sodium hydroxide or sodium carbonate under the given conditions lies in the range of approximately 0.1 Molar to 1 Molar, as this gives a product with a low oxygen content (8-10% w/w) without using unnecessarily high catalyst concentrations.

Figure 2:
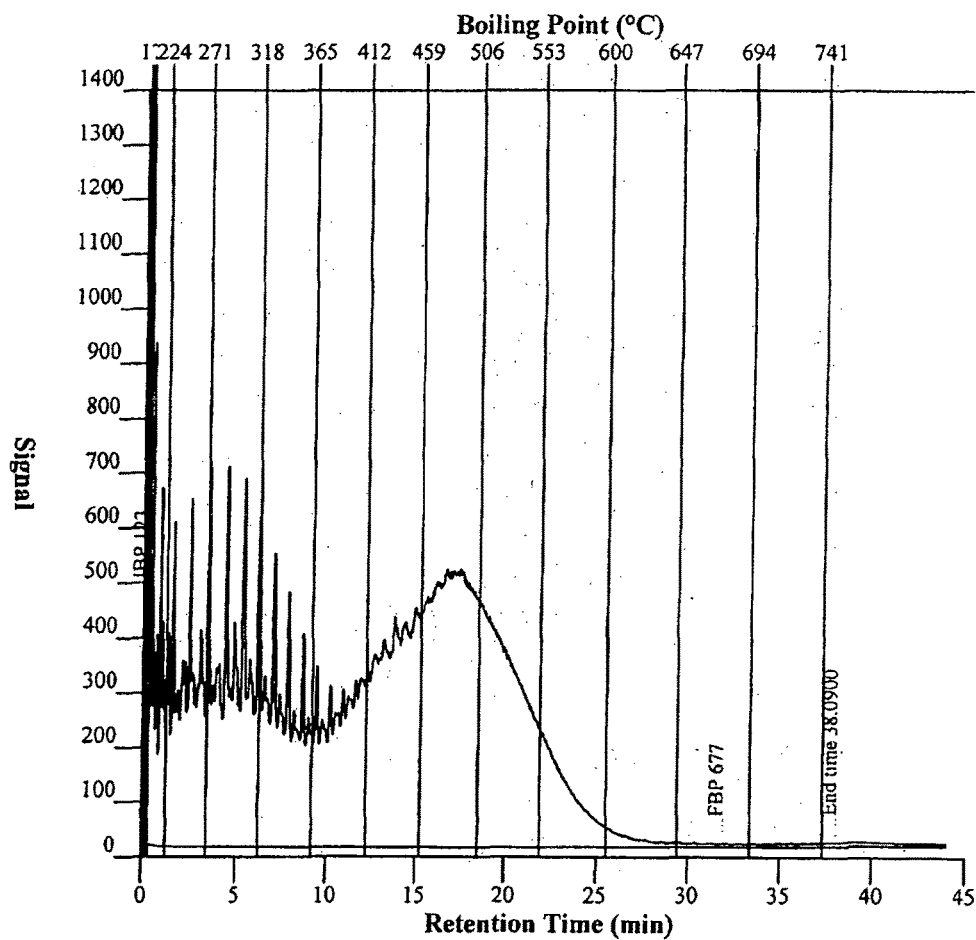
FIG. 2 is a graph showing simulated distillation of typical Lignite derived Coal Oil to ASTM D7169.

Additional Characterization of Coal Oil Derived from Lignite:

As shown in Table 6 below and FIG. 2, the simulated distillation of typical lignite-derived coal oil (Table 2a—feedstock sample no. 20) illustrated the similarity of the product to crude oil. 99% of the oil is recovered from the GC column used for the simulated distillation at 620° C., indicating that the product does not have a significant amount of low volatility residue.

The characteristics of the lignite coal oil were also investigated by 1H and quantitative 13C NMR spectroscopy. The product oil was distilled into different boiling ranges for this test, and NMR spectra of the fractions were recorded. The fractions in this example are designated as follows.

TABLE 7 designation of fractions for NMR

| Sample code | Approx. boiling range/C. | Approx abundance % weight |
|---|---|---|
| A | 60-300, mainly 250-300 | 17 |
| B | 300-340 C. | 17 |
| C | 160-200 at approx 1-10 mbar | 9 |
| D | 200-250 at approx 1-10 mbar | 24 |
| E | 250-300 at approx 1-10 mbar | 15 |
| F | Up to 620 | 18 |

Figure 3A:
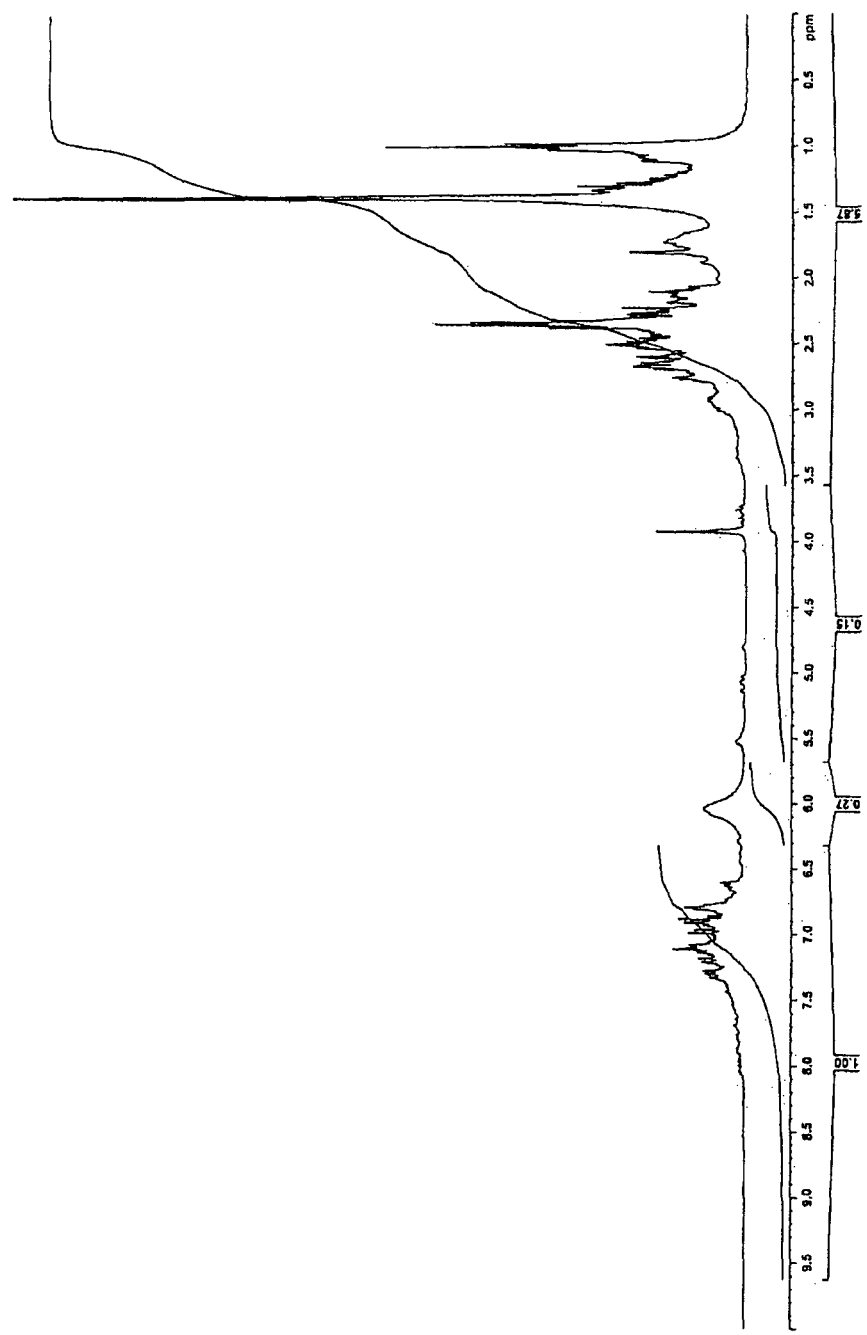
FIGS. 3a-3l provide proton NMR and quantitative 13C NMR spectra for fractions A-F as shown in Table 6 (proton NMR first). Sample code A (FIGS. 3A-3B); Sample code B (FIGS. 3C-3D); Sample code C (FIGS. 3E-3F); Sample code D (FIGS. 3G-3H); Sample code E (FIGS. 3I-3J); Sample code F (FIGS. 3K-3L).
Figure 3B:
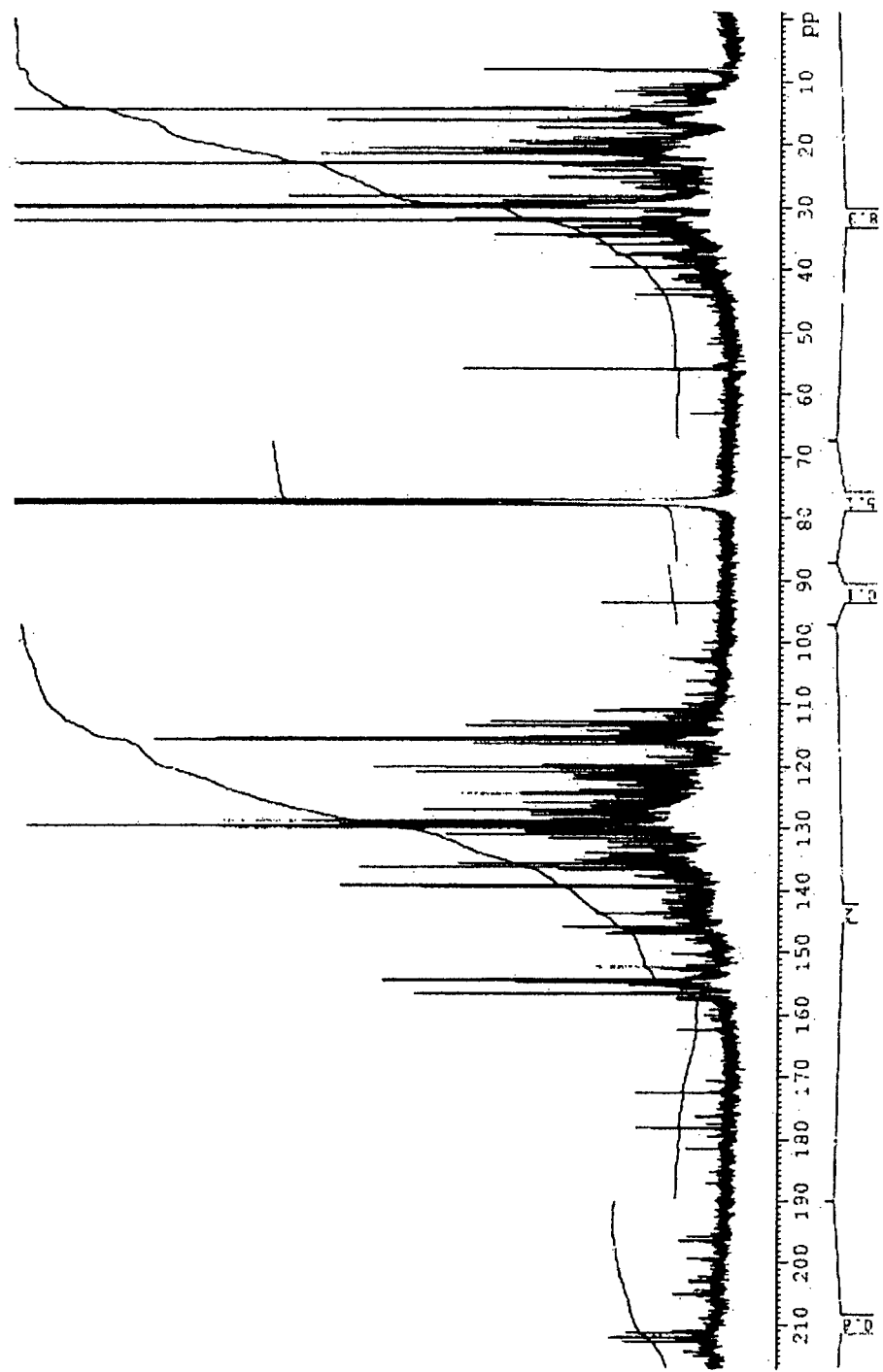
Figure 3C:
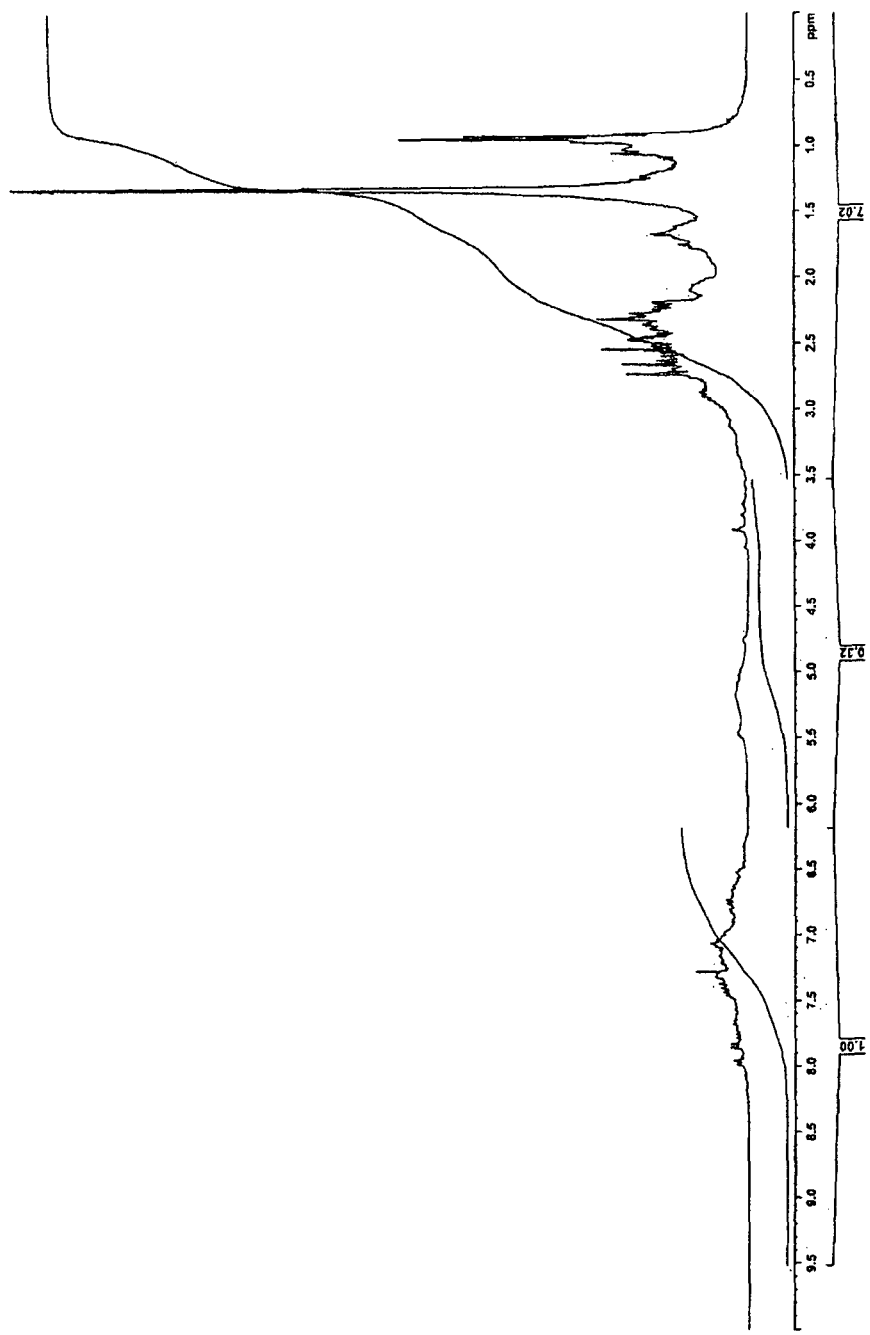
Figure 3D:
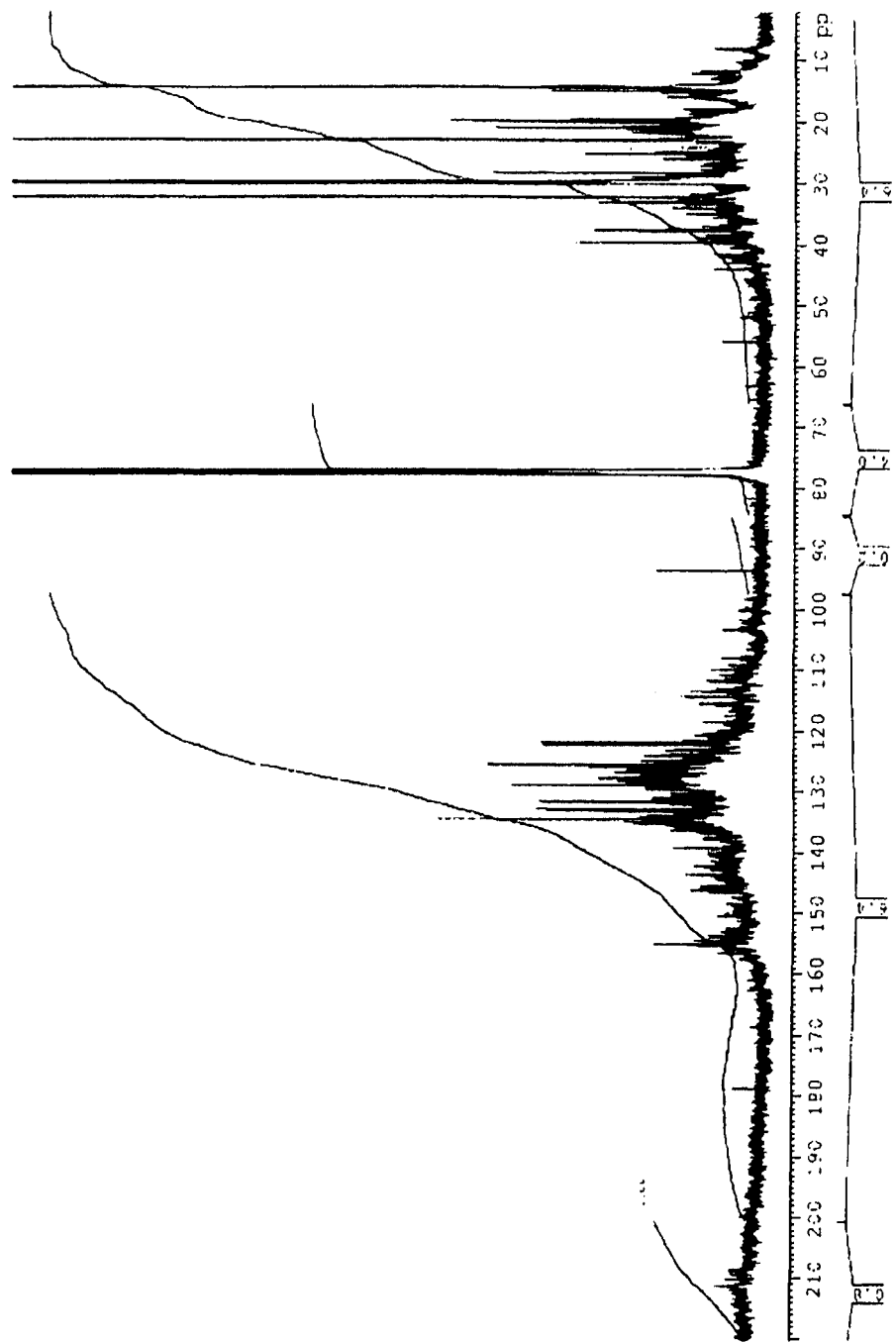
Figure 3E:
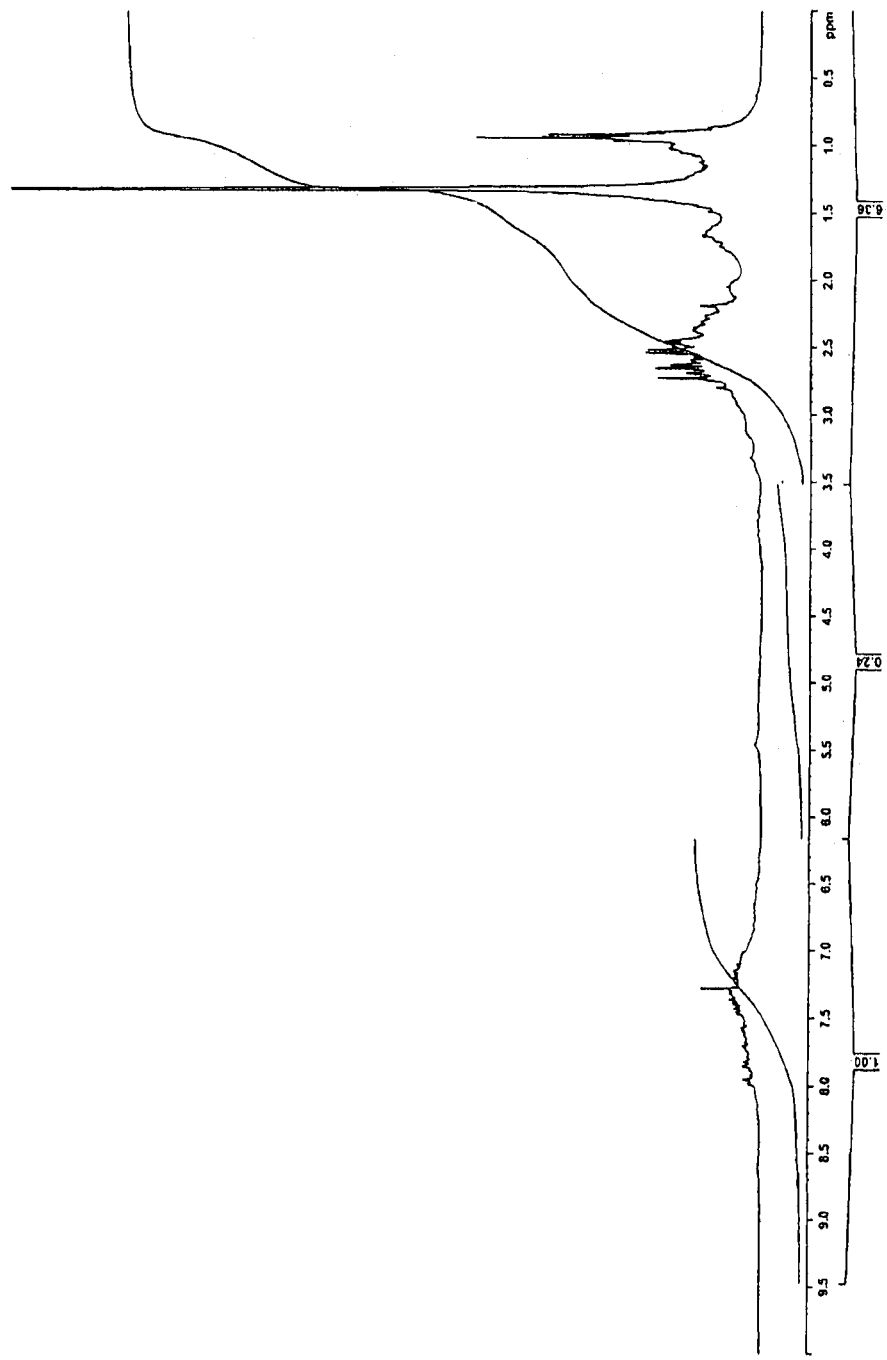
Figure 3F:
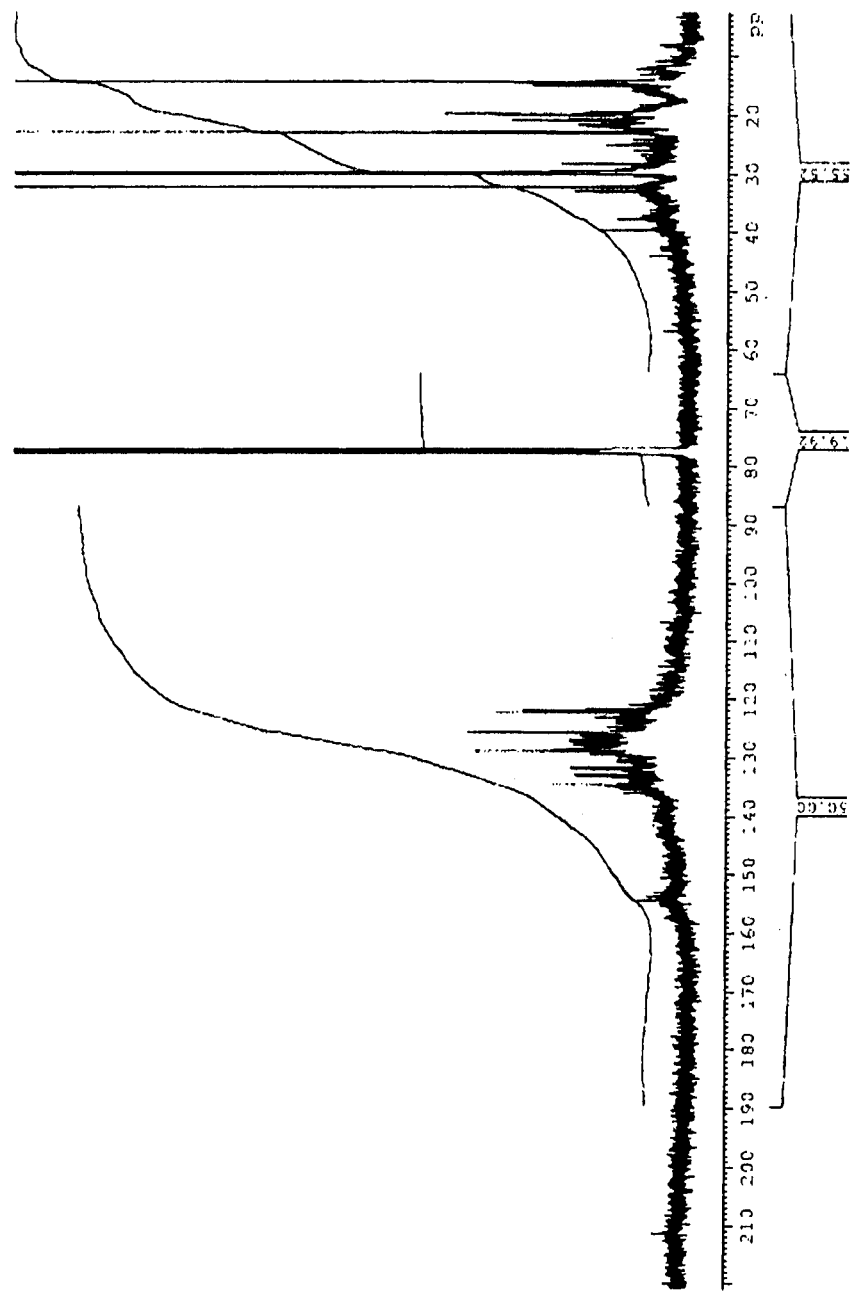
Figure 3G:
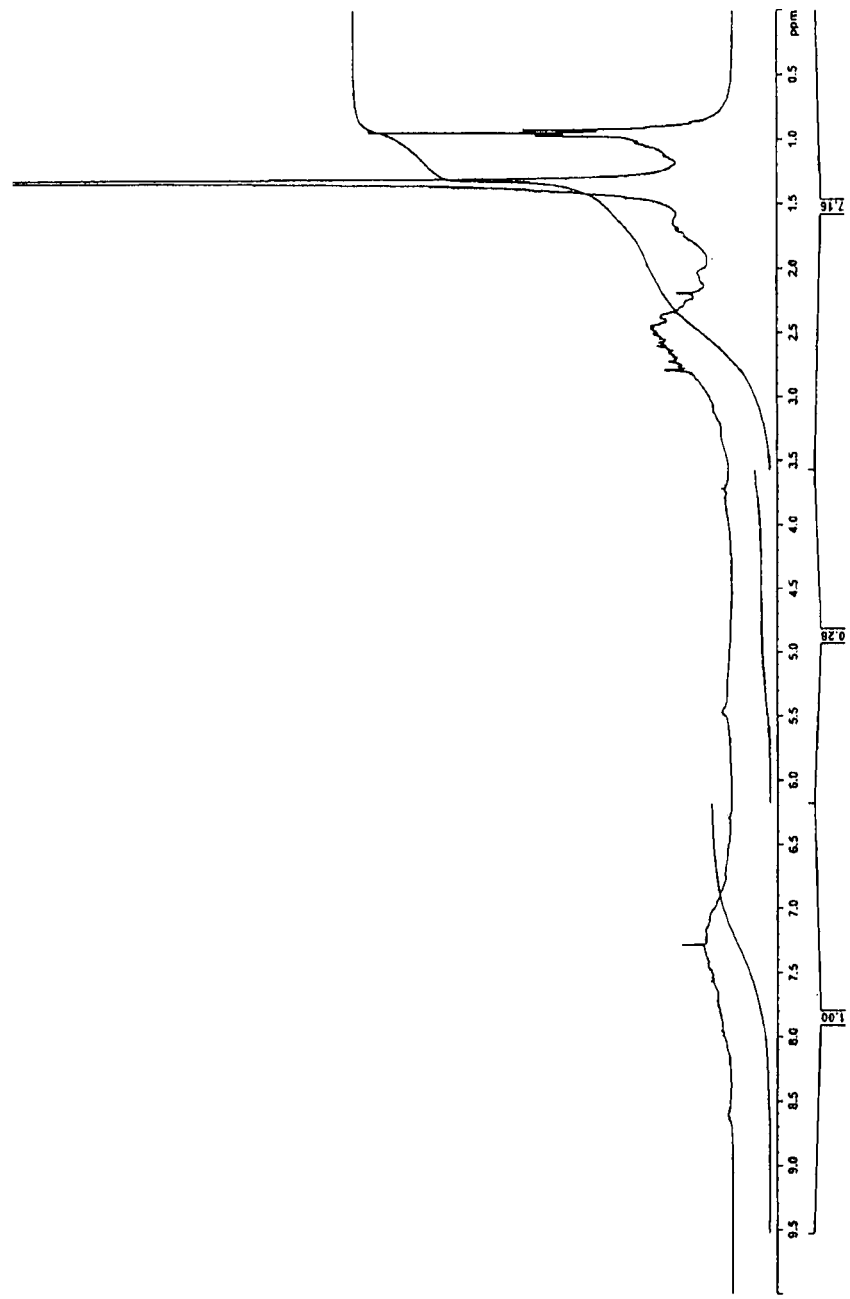
Figure 3H:
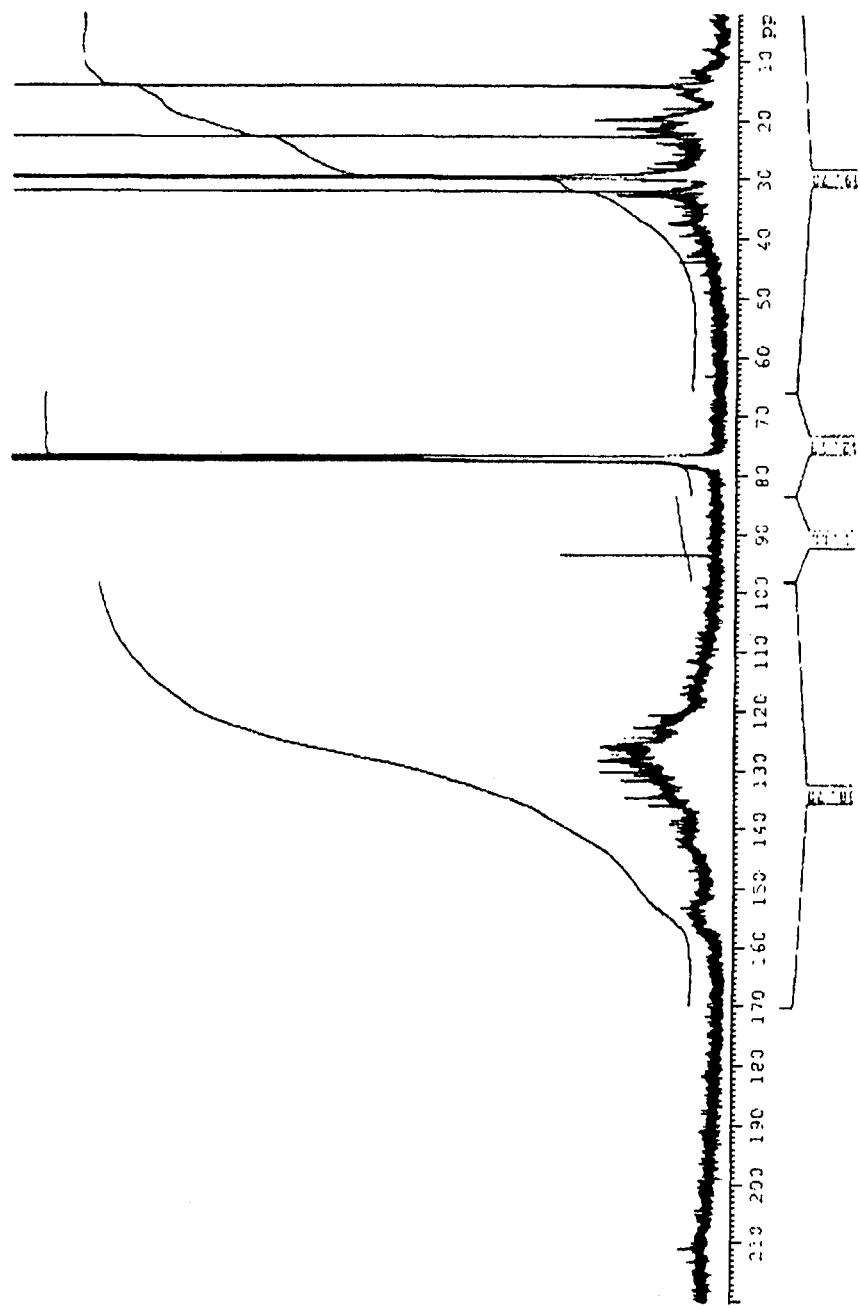
Figure 3I:
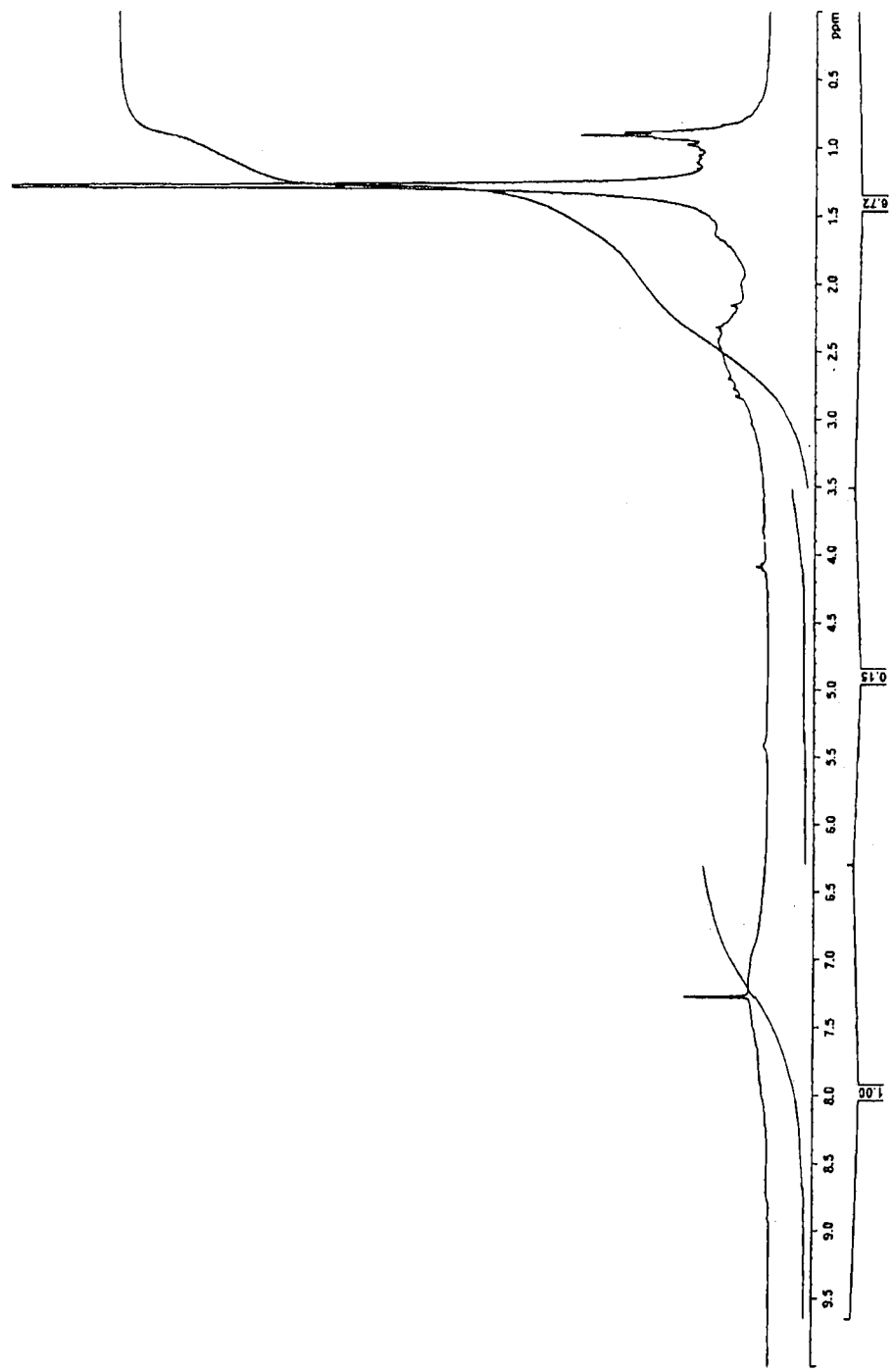
Figure 3J:
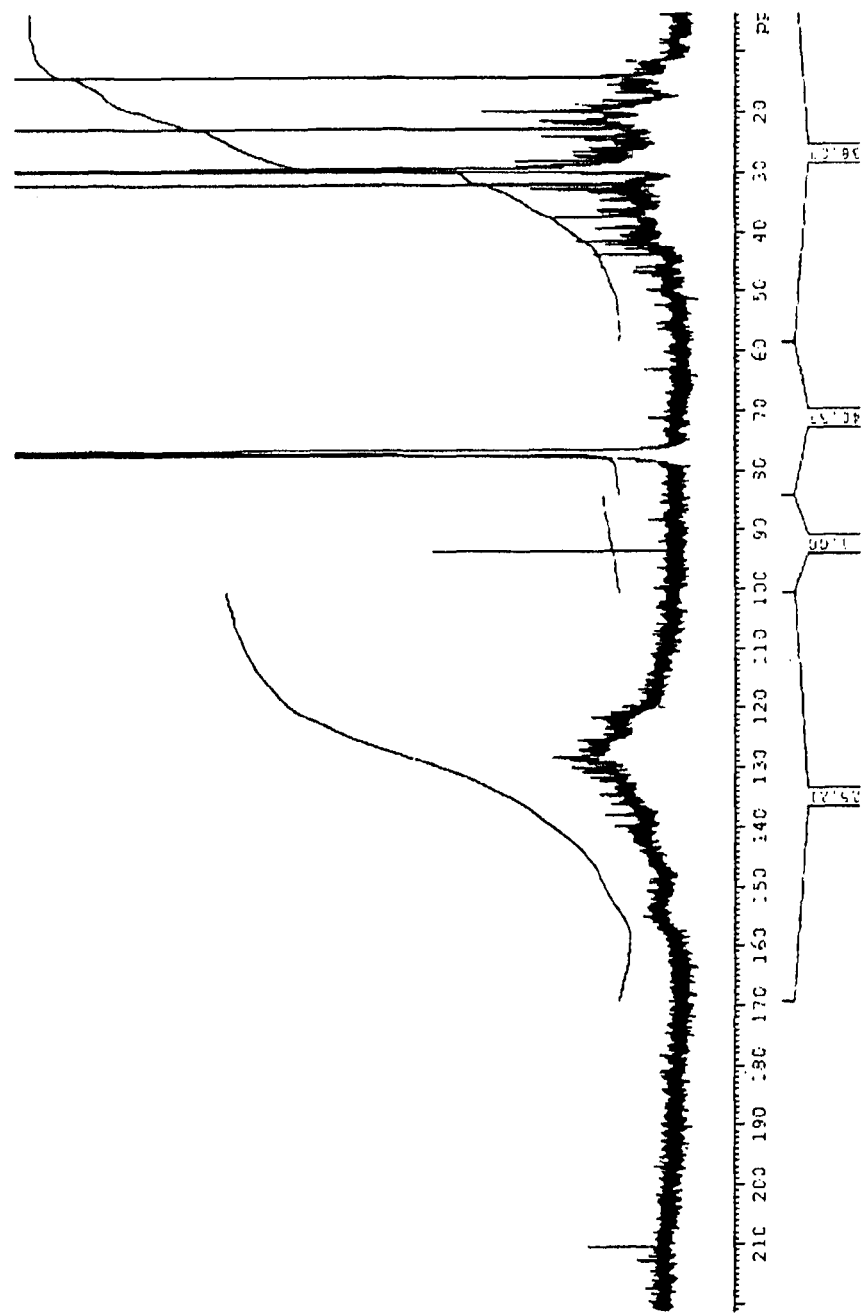
Figure 3K:
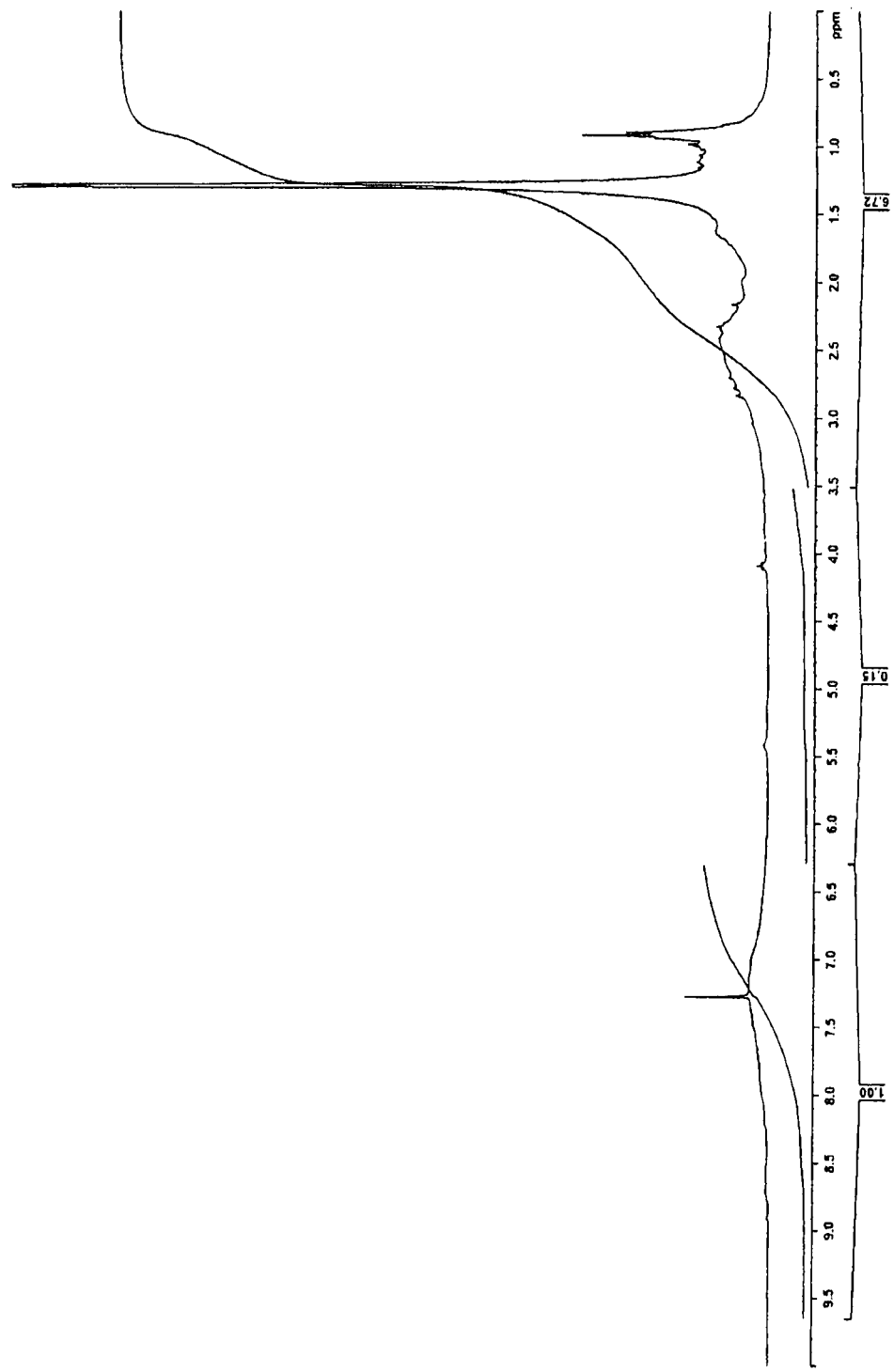
Figure 3L:
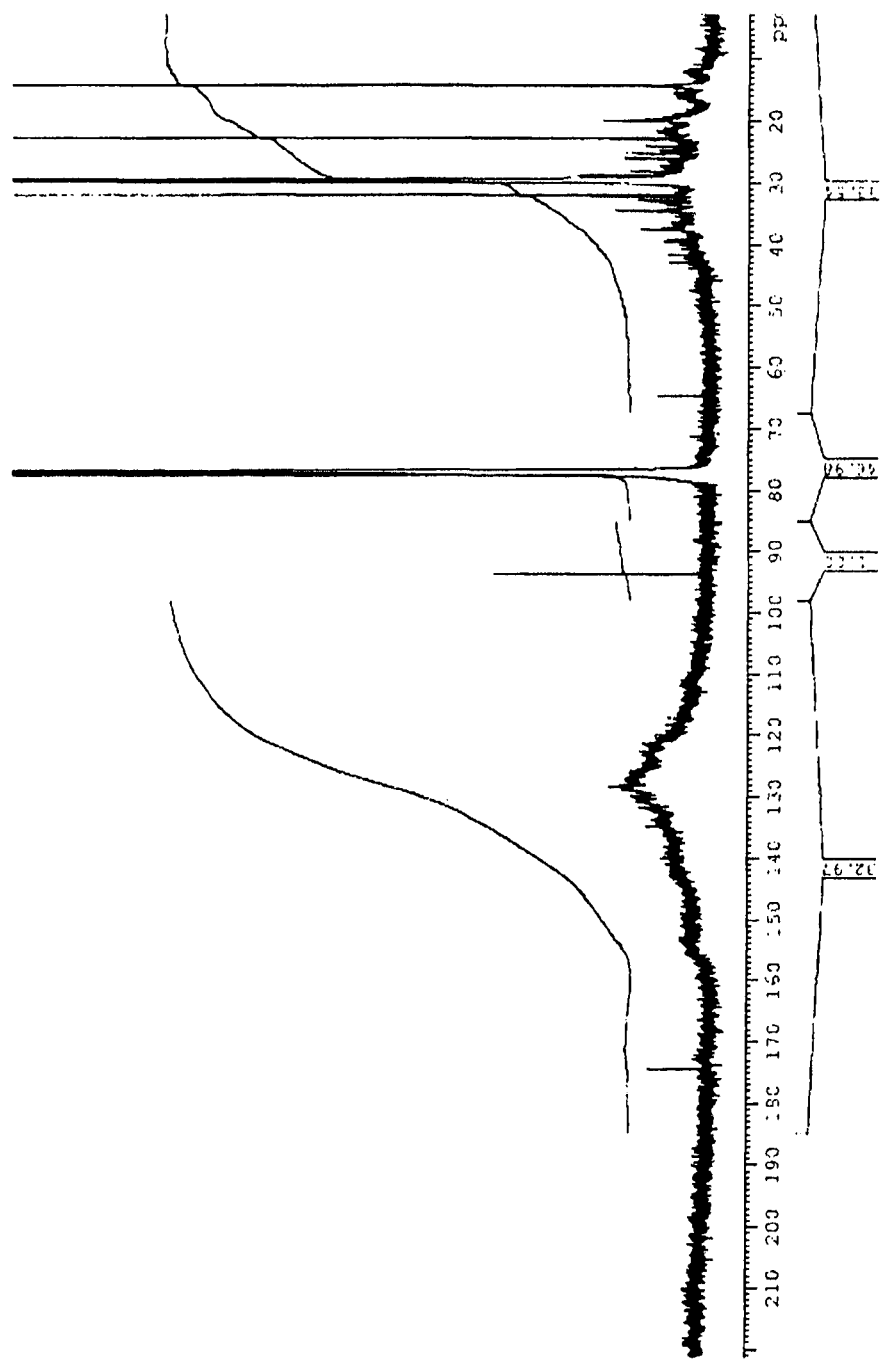

Proton NMR and quantitative 13C NMR spectra are shown for each fraction referred in Table 7 as FIGS. 3A-3L (proton NMR first). Sample code A (FIGS. 3A-3B); Sample code B (FIGS. 3C-3D); Sample code C (FIGS. 3E-3F); Sample code D (FIGS. 3G-3H); Sample code E (FIGS. 3I-3J); Sample code F (FIGS. 3K-3L).

The 1H NMR spectra were integrated into three chemical shift regions which have been loosely designated as follows:
"Aromatic" 9.5 to about 6.2 ppm
"Olefinic" 6.2 to about 3.5 ppm
"Aliphatic" Below 3.5 ppm In practice, olefinic protons can have shifts of up to 7.1 ppm or higher, depending on substitution patterns, so there is likely to be overlap between "olefinic" and "aromatic" protons. For 1H nmr the integration is approximately proportional to the number of protons present in a particular chemical shift region. The integrations have been used to assign the proportion of "Aromatic", "Olefinic" and "Aliphatic" protons present in the fractions.

TABLE 8 lignite-derived oil characteristics

| Fraction ID | Approx. BP range/° C. | Appearance | Abundance of proton type/% | | |
|---|---|---|---|---|---|
| | | | "Aromatic" | "Olefinic" | "Aliphatic" |
| A | 150-300 | Mobile Oil | 14 | 6 | 81 |
| B | 300-340 | Mobile Oil | 12 | 4 | 84 |
| C | 160-200 @ 0(mbar) | Waxy Oil | 13 | 3 | 84 |
| D | 200-250 @ 0(mbar) | Waxy | 12 | 3 | 85 |
| E | 250-300 @ 0(mbar) | Waxy | 10 | 2 | 87 |
| F | >300 @ 0(mbar) | Bitumen-like | 13 | 2 | 85 |

The 1H nmr spectra show a wide variety of chemical environments for the protons in the fractions, as expected. By far the most abundant environment in all fractions is near 1.4 ppm, typical of a methylene (—$CH_2$—) proton in a straight alkyl chain. This suggests an abundance of straight hydrocarbon chains, which is an indication of a high quality bio-oil, relatively easy to upgrade to a 'drop-in' fuel such as diesel or gasoline.

The 13C spectra suggest that the ratio of (aromatic and olefinic):aliphatic carbon environments is roughly 1:1 in most of the fractions, with the exception of fraction E, where it is more like 2:3. Fraction A contained a significant abundance of carbonyl environments.

Overall the combination of 1H and 13C data suggests that overall the coal oil may be a mixture of substituted mono-, di- and tri-aromatics and straight chain hydrocarbons, with much of the remaining oxygen associated with the aromatic compounds. Again, this suggests a high quality bio-oil, relatively easy to upgrade by hydrotreating/hydrocracking to a 'drop-in' fuel such as diesel, jet fuel or gasoline. The abundance of carbons bonded to a heteroatom such as oxygen decreases with increasing boiling point, and this is confirmed by elemental analysis (Table 9, below). This suggests that much of the oxygen may be present in single-ring aromatic structures, e.g. phenols, and this suggests relatively mild hydrotreating conditions may be effective at removing the remaining oxygen from the coal oil.

TABLE 9

Elemental analysis of lignite-derived oil fractions

| Fraction | Carbon % w as rec'd | Hydrogen % w as rec'd | Nitrogen % w as rec'd | % Sulphur % w as rec'd | O by difference % w as rec'd |
|---|---|---|---|---|---|
| A | 80.7 | 9.1 | 0.29 | 0.30 | 9.61 |
| B | 83.3 | 9.1 | 0.32 | 0.30 | 6.98 |
| C | 84.6 | 9.0 | 0.27 | 0.34 | 5.79 |
| D | 84.7 | 9.2 | 0.39 | 0.29 | 5.42 |
| E | 86.1 | 9.4 | 0.36 | 0.22 | 3.92 |
| F | 92 | 8.0 | 0.26 | 0.27 | 0.00 |

Figure 4:
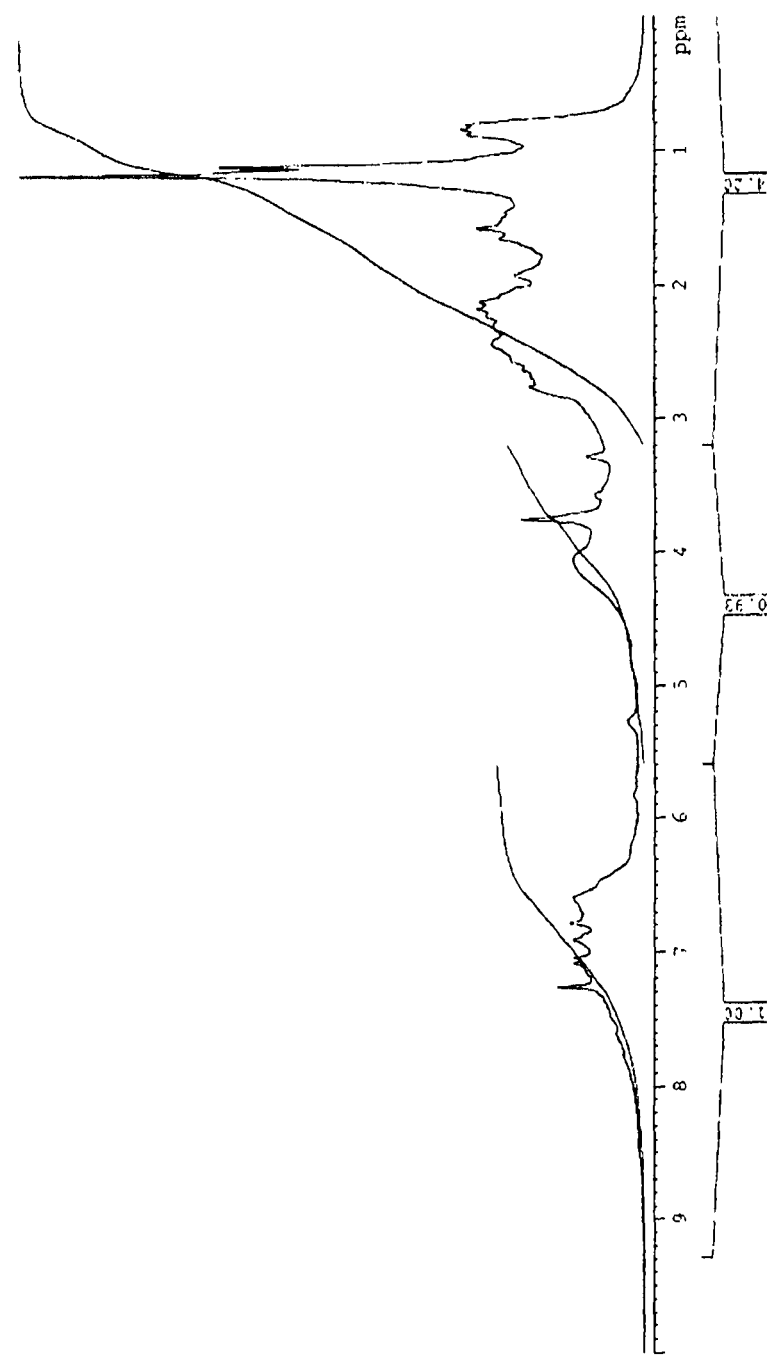
FIG. 4 shows a 1H NMR spectrum of typical bio-oil derived from Radiata Pine from Feedstock Sample number 4 in Table 2B.

Additional Characterization of Bio-Oil Derived from Lignocellulosic Material (Radiata Pine):

The 1H NMR spectrum of a typical Bio-Oil sample is shown in FIG. 4. The spectrum is shows broad peaks, the ratio of (aromatic plus olefinic):aliphatic protons is approximately 1:4, which is similar to the ratios found in the coal oil fractions. There are some proton environments near 4 ppm, suggestive of methoxy—(—OCH3) protons. These are generally less prominent in the coal oil fractions.

By far the most abundant environment in all fractions is near 1.4 ppm, typical of a methylene (—$CH_2$—) proton in a straight alkyl chain. This suggests an abundance of straight hydrocarbon chains, which is an indication of a high quality bio-oil, relatively easy to upgrade to a 'drop-in' fuel such as diesel or gasoline.

Figure 5:
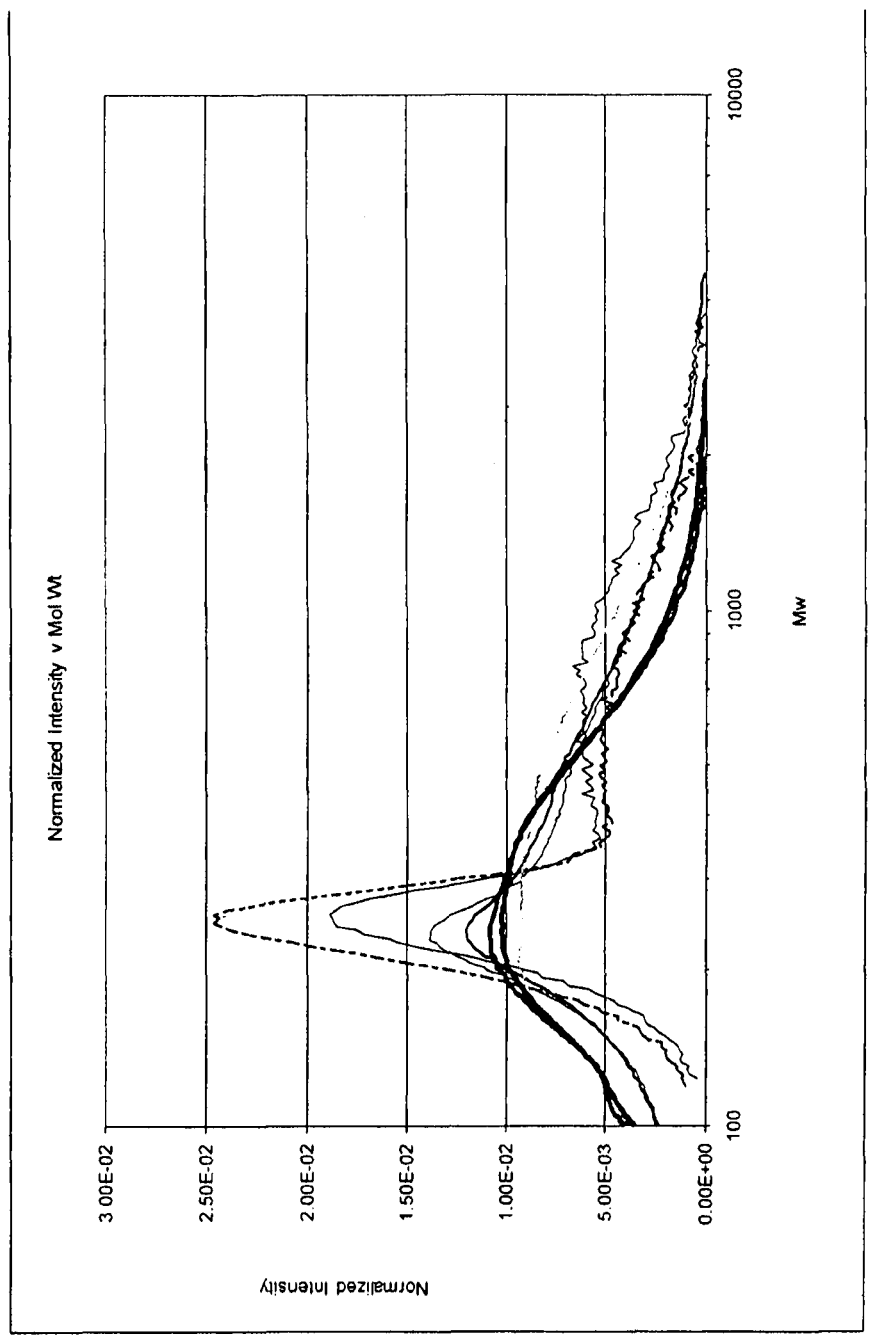
FIG. 5 shows normalized intensity (GPC) versus molecular weight for typical bio-oil products from radiata pine.

FIG. 5 shows a range of molecular weight distributions determined by gel permeation chromatography for typical bio-oils prepared from radiata pine. The molecular weight distribution varies according to processing conditions; longer residence times tend to produce broader molecular weight distributions.

The peaks in molecular weight distributions are at about 200-300 Daltons, suggesting a substantial amount of material in the diesel-like molecular weight range (Cetane has a molecular weight of 226 Daltons). Again, this suggests a high quality bio-oil.

Characterization of Water-Soluble Organic Materials

Although of relatively low abundance, organic molecules contained in the water phase associated with bio-oil production are of interest as chemical feedstocks. The water soluble compounds may be collected by, for example, liquid-liquid extraction (LLE) with suitable solvents (e.g. ethers, ketones, acetates, toluene) or by evaporation of the water, or a combination of these steps.

Table 10 shows typical elemental analyses of bio-oils collected from the water phase for lignite and lignocellulosic material (radiate pine) feedstocks.

TABLE 10

Calorific value and elemental composition of bio-oils collected from water phases.

| Feedstock Type | GCV (MJ/kg db) | Carbon (% wt db) | Hydrogen (% wt db) | Nitrogen (% wt db) | Sulphur (% wt db) | Ash (% wt db) | Oxygen (% wt db) | Molar H/C Ratio |
|---|---|---|---|---|---|---|---|---|
| Pinus Radiata | 31.27 | 65.87 | 7.66 | 0.04 | 0.01 | — | 26.42 | 1.38 |
| Pinus Radiata | 32.09 | 67.05 | 7.80 | 0.48 | 0.10 | — | 24.58 | 1.39 |
| Pinus Radiata | 31.67 | 69.80 | 7.61 | 0.07 | 0.03 | — | 22.49 | 1.30 |
| Lignite | 28.48 | 67.88 | 6.76 | 0.01 | 0.09 | — | 25.26 | 1.19 |

Gas Chromatography Mass Spectrometry (GCMS) analysis shows that oils collected from the water phases of processed lignocellulosic material such as radiata pine slurries contain valuable chemical feedstocks and intermediates, including those used in food and fragrance industries. Non-limiting examples of such compounds are Phenol; Phenol, 2-methoxy-(Guaiacol); Phenol, 4-ethyl-2-methoxy-(4-ethylguaiacol); Phenol, 2-methoxy-4-propyl-(dihydroeugenol); Vanillin; Phenol, 2-methoxy-4-(1-propenyl)-(isoeugenol); Eugenol.

Figure 6:
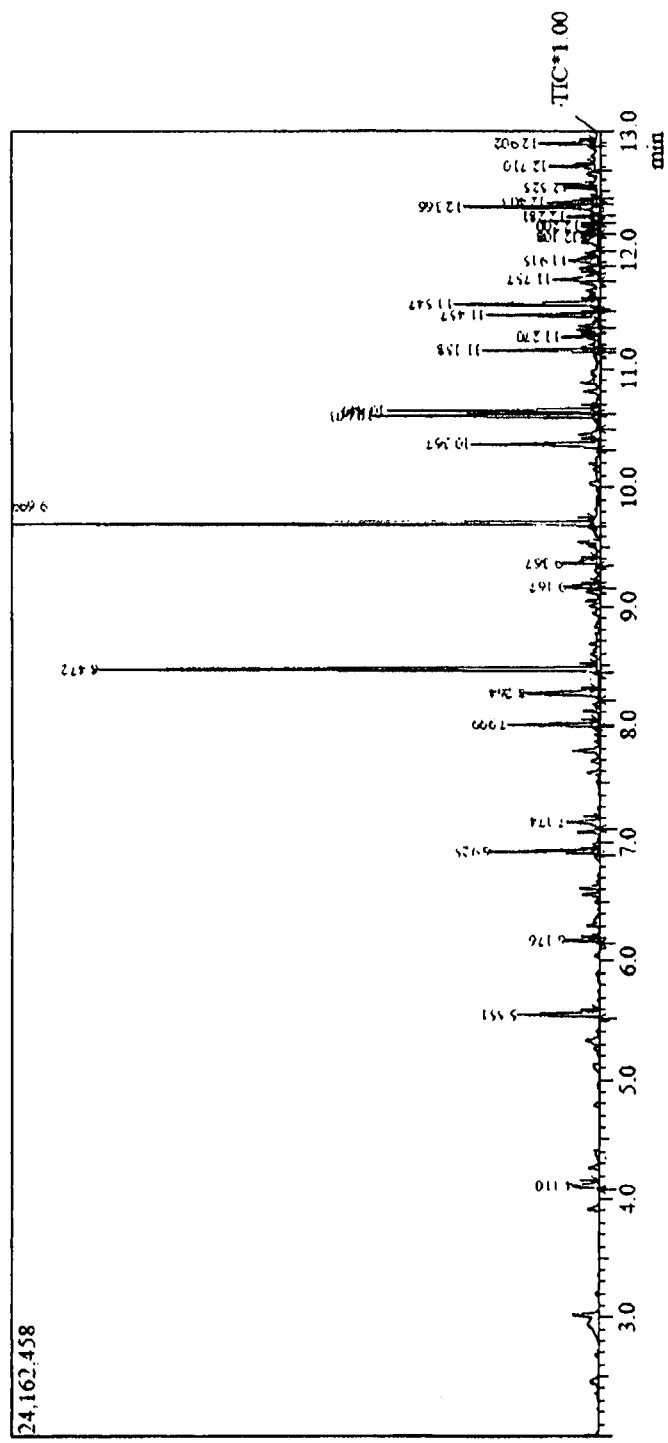
FIG. 6 shows a partial Gas Chromatography Mass Spectrometry (GCMS) analysis of water-borne bio-oil derived from lignocellulosic material, showing identification of most abundant components.

FIG. 6 shows a partial GCMS analysis of a typical sample. Peak information corresponding to FIG. 6 is shown below.

Peak Report TIC

| Peak# | R. Time | I. Time | F. Time | Area | Area % | Height | Name |
|---|---|---|---|---|---|---|---|
| 1 | 4.110 | 4.083 | 4.158 | 1892961 | 1.10 | 1048103 | 2-Heptene, (E)- |
| 2 | 5.551 | 5.525 | 5.600 | 4845322 | 2.82 | 3361465 | 2-Cyclopenten-1-one, 2-methyl- |
| 3 | 6.176 | 6.150 | 6.208 | 1836161 | 1.07 | 1328869 | 2-Cyclopenten-1-one, 2,3-dimethyl- |
| 4 | 6.925 | 6.900 | 6.958 | 5118173 | 2.98 | 4399064 | Phenol |
| 5 | 7.174 | 7.117 | 7.217 | 2212872 | 1.29 | 1363247 | 2-Cyclopenten-1-one, 2,3-dimethyl- |
| 6 | 7.999 | 7.975 | 8.042 | 4111643 | 2.39 | 3678258 | Phenol, 3-methyl- |
| 7 | 8.264 | 8.208 | 8.308 | 5505584 | 3.20 | 2978128 | Phenol, 3-methyl- |
| 8 | 8.472 | 8.442 | 8.517 | 24317667 | 14.15 | 20429867 | Phenol, 2-methoxy- |
| 9 | 9.167 | 9.142 | 9.200 | 2169612 | 1.26 | 1291213 | Phenol, 2,5-dimethyl- |
| 10 | 9.367 | 9.342 | 9.417 | 2291667 | 1.33 | 1407891 | Phenol, 3-ethyl- |
| 11 | 9.699 | 9.667 | 9.750 | 26143596 | 15.22 | 23765767 | 2,3-Dimethylhydroquinone |
| 12 | 10.367 | 10.325 | 10.408 | 6205053 | 3.61 | 5239459 | 1,2-Benzenediol, 4-methyl- |
| 13 | 10.603 | 10.492 | 10.625 | 11674941 | 6.80 | 9207746 | Phenol, 4-ethyl-2-methoxy- |
| 14 | 10.649 | 10.625 | 10.692 | 9139019 | 5.32 | 8685435 | 1,2-Benzenediol, 4-methyl- |
| 15 | 11.158 | 11.133 | 11.175 | 5024156 | 2.92 | 4774011 | 1,4-Benzenediol, 2-methyl- |
| 16 | 11.270 | 11.175 | 11.292 | 2962108 | 1.72 | 1531083 | 2,5-Dimethylhydroquinone |
| 17 | 11.457 | 11.342 | 11.492 | 6551464 | 3.81 | 4601891 | Phenol, 2-methoxy-4-propyl- |
| 18 | 11.547 | 11.492 | 11.600 | 8491644 | 4.94 | 5946841 | 4-Ethylcatechol |
| 19 | 11.757 | 11.742 | 11.817 | 2958977 | 1.72 | 1869419 | Vanillin |
| 20 | 11.915 | 11.875 | 11.950 | 2381124 | 1.39 | 1213818 | 1,3-Benzenediol, 4-ethyl- |
| 21 | 12.108 | 12.000 | 12.133 | 2438145 | 1.42 | 719577 | Phenol, 4-ethyl-2-methoxy- |
| 22 | 12.200 | 12.133 | 12.225 | 1762113 | 1.03 | 706135 | Phenol, 2-methoxy-4-(1-propenyl)-, (Z |
| 23 | 12.281 | 12.233 | 12.300 | 1752692 | 1.02 | 1284826 | Phenol, 2-methoxy-4-propyl- |
| 24 | 12.366 | 12.300 | 12.383 | 6740063 | 3.92 | 5519653 | 1,3-Benzenediol, 4-propyl- |
| 25 | 12.403 | 12.383 | 12.442 | 2804791 | 1.63 | 2064444 | Phenol, 2-methoxy-4-(1-propenyl)-, (E |
| 26 | 12.525 | 12.442 | 12.542 | 1818747 | 1.06 | 1125844 | Ethanone, 1-(4-hydroxy-3-methoxyphe |
| 27 | 12.710 | 12.667 | 12.742 | 2391608 | 1.39 | 1887661 | 1,2-Dimethoxy-4-n-propylbenzene |
| 28 | 12.902 | 12.875 | 12.933 | 2804803 | 1.63 | 2228508 | 5-Methoxycarbonylpyridine-2-carboxy |
| 29 | 13.154 | 13.125 | 13.183 | 10441687 | 6.08 | 8068955 | Benzoic acid, 2,3-dimethyl- |
| 30 | 13.832 | 13.808 | 13.858 | 3020188 | 1.76 | 2467624 | Eugenol |

Figure 7:
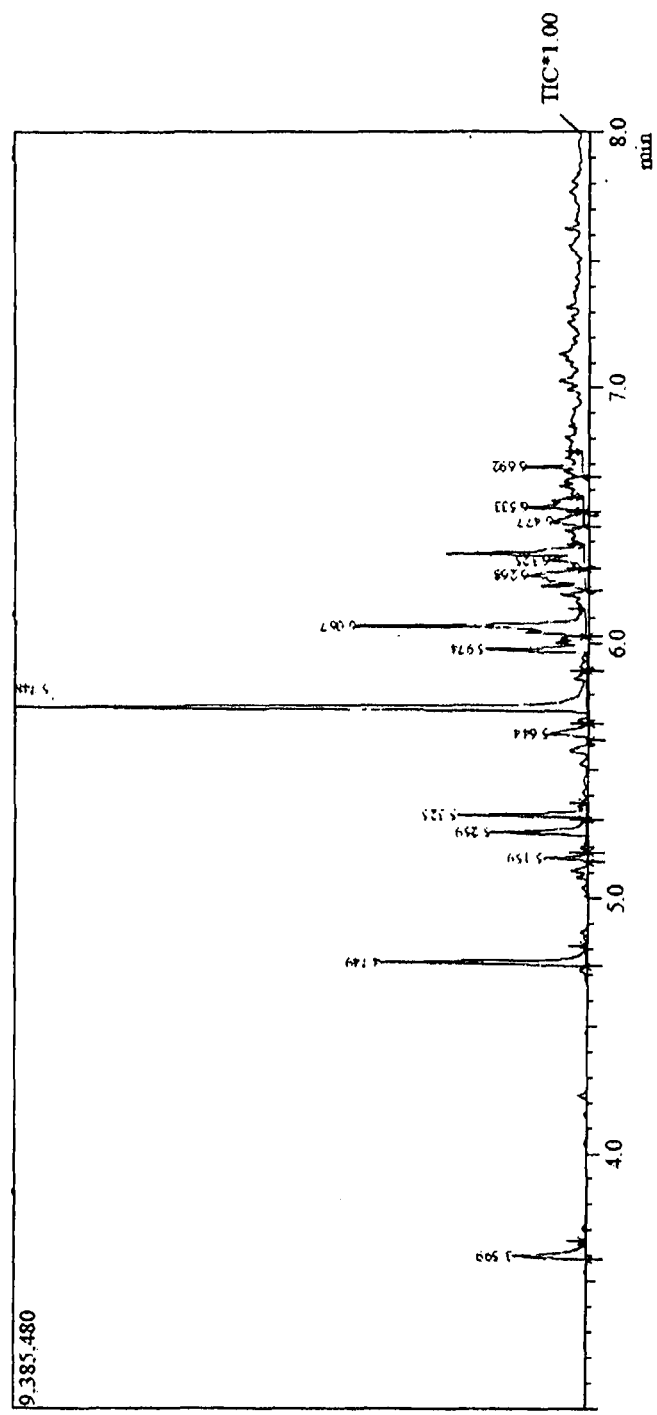
FIG. 7 shows a partial Gas Chromatography Mass Spectrometry (GCMS) analysis of oil collected from water phase associated with processing of lignite slurry. The most abundant compound is catechol (1,2-benzenediol).

Bio-oils collected from the water phase generated when lignite slurries are processed are generally richer in catechols and phenols and contain fewer methoxy-substituted compounds. These materials are valuable feedstocks for the chemical industry. FIG. 7 shows a partial GCMS analysis of a such an oil. Peak information corresponding to FIG. 7 is shown below.

Peak Report TIC

| Peak# | R. Time | I. Time | F. Time | Area | Area % | Height | Name |
|---|---|---|---|---|---|---|---|
| 1 | 3.599 | 3.583 | 3.658 | 1470437 | 4.16 | 1189280 | 2-Hexanol, 2-methyl- |
| 2 | 4.749 | 4.733 | 4.817 | 2767299 | 7.83 | 3347650 | Phenol |
| 3 | 5.159 | 5.142 | 5.183 | 516144 | 1.46 | 713147 | Phenol, 3-methyl- |
| 4 | 5.259 | 5.183 | 5.308 | 1600549 | 4.53 | 1552532 | Phenol, 3-methyl- |
| 5 | 5.325 | 5.308 | 5.375 | 1642620 | 4.65 | 2096663 | Phenol, 2-methoxy- |
| 6 | 5.644 | 5.617 | 5.683 | 858510 | 2.43 | 614175 | Phenol, 2,3-dimethyl- |

-continued

| | | | | | Peak Report TIC | | |
|---|---|---|---|---|---|---|---|
| Peak# | R. Time | I. Time | F. Time | Area | Area % | Height | Name |
| 7 | 5.748 | 5.683 | 5.892 | 9552121 | 27.04 | 9352902 | 1,2-Benzenediol |
| 8 | 5.974 | 5.892 | 6.025 | 2548485 | 7.21 | 1635189 | 1,2-Benzenediol, 4-methyl- |
| 9 | 6.067 | 6.025 | 6.133 | 4619295 | 13.07 | 3752632 | 1,2-Benzenediol, 4-methyl- |
| 10 | 6.268 | 6.208 | 6.292 | 2364042 | 6.69 | 891727 | 2-Methoxy-6-methylphenol |
| 11 | 6.325 | 6.292 | 6.383 | 2903853 | 8.22 | 536646 | 1,4-Benzenediol, 2-methyl- |
| 12 | 6.477 | 6.458 | 6.517 | 891055 | 2.52 | 481187 | 1,4-Benzenediol, 2,6-dimethyl- |
| 13 | 6.533 | 6.517 | 6.575 | 1382085 | 3.91 | 874823 | Methanol, (4-carboxymethoxy)benzoyl |

INCORPORATION BY REFERENCE

This application claims priority from Australian provisional patent application number 2010901473 filed on 7 Apr. 2010, the entire contents of which are incorporated herein by reference.

The invention claimed is:

1. A method for producing a biofuel, the method comprising:
  treating organic matter selected from the group consisting of lignocellulosic matter, coal, oil shale, peat, and coke, with an aqueous solvent and at least one additional catalyst selected from the group consisting of: an alkali metal formate catalyst; an alkali metal carbonate catalyst; a transition metal catalyst; a transition metal salt catalyst; a transition metal formate catalyst; an alkali metal salt catalyst; an alkaline earth metal salt catalyst; an acid catalyst; a solid acid catalyst; a water-gas-shift catalyst; a zeolite or aluminosilicate catalyst; a supported transition metal catalyst; a sulphide catalyst; and a base catalyst that is an alkali metal salt or a transition metal salt; at a temperature of between 275° C. and about 375° C., and a pressure of between about 150 bar and about 275 bar, wherein the organic matter and aqueous solvent is provided in the form of a slurry, and said treating is under conditions of continuous flow with a minimum volume-independent flow velocity of the slurry greater than the settling velocity of solid matter within the slurry; and
  cooling and depressurisation of the slurry,
  wherein:
  the organic matter is not separated prior to said treating, and the at least one additional catalyst is added to the organic matter after heating to said temperature and after pressurising to said pressure.

2. The method according to claim 1, wherein said additional transition metal salt catalyst, alkali metal salt catalyst, alkali earth metal salt catalyst, or base catalyst is an oxide, hydroxide, carbonate, or sulfide.

3. The method according to claim 1, wherein said additional base catalyst is an alkali metal hydroxide catalyst or a transition metal hydroxide catalyst.

4. The method according to claim 2, wherein said additional base catalyst is sodium hydroxide or potassium hydroxide.

5. The method according to claim 1, wherein said alkali metal carbonate catalyst is sodium carbonate or potassium carbonate.

6. The method according to claim 1, wherein said additional catalyst is a transition metal.

7. The method according to claim 1, wherein said alkali metal formate catalyst is sodium formate or potassium formate.

8. The method according to claim 1, wherein said additional catalyst is iron metal, an iron oxide or an iron sulfide.

9. The method according to claim 1, wherein said organic matter is fossilised organic matter having a carbon content of at least 50% and said aqueous solvent is water.

10. The method according to claim 9, wherein said temperature is between about 320° C. and about 360° C., and said pressure is between about 200 bar and about 250 bar.

11. The method according to claim 9, wherein said fossilised organic matter is lignite, said temperature is between about 340° C. and about 360° C., and said pressure is between about 200 bar and about 240 bar.

12. The method according to claim 1, wherein said biofuel comprises one or more of an oil component, a char component and a gaseous component comprising methane, hydrogen, carbon monoxide and carbon dioxide.

13. The method according to claim 1, wherein said organic matter is lignocellulosic matter, and said aqueous solvent comprises alcohol.

14. The method according to claim 13, wherein said lignocellulosic matter comprises more than about 10% of each of lignin, cellulose, and hemicellulose.

15. The method according to claim 13, wherein said temperature is between about 270° C. and about 360° C., said pressure is between about 170 bar and about 250 bar, and said solvent comprises between about 5% and 40% alcohol by weight.

16. The method according to claim 13, wherein said temperature is between about 300° C. and about 340° C., said pressure is between about 200 bar and about 240 bar, and said solvent comprises between about 10% and about 30% alcohol by weight.

17. The method according to claim 13, wherein said alcohol is ethanol.

18. The method according to claim 1, wherein said method comprises the step of heating the organic matter and aqueous solvent to said temperature in a time period of less than about 2 minutes prior to said treating.

19. The method according to claim 1, wherein said method comprises the steps of:
  (i) cooling the organic matter to a temperature of between about 160° C. and about 200° C. in a time period of less than about 30 seconds after said treating; and
  (ii) depressurisation and cooling the organic matter to ambient temperature by release through a pressure let down device.

20. The method according to claim 1, wherein said biofuel comprises an oil component having a gross calorific value of more than 35 MJ/kg greater than about 8% weight dry basis (wt db) hydrogen and less than about 10% wt db oxygen.

21. The method according to claim 1, wherein said organic matter is fossilised organic matter having a carbon content of at least 60%, and said aqueous solvent is water.

* * * * *